United States Patent
Fullerton et al.

(10) Patent No.: US 7,817,005 B2
(45) Date of Patent: Oct. 19, 2010

(54) CORRELATED MAGNETIC CONTAINER AND METHOD FOR USING THE CORRELATED MAGNETIC CONTAINER

(75) Inventors: Larry W. Fullerton, New Hope, AL (US); Mark D. Roberts, Huntsville, AL (US)

(73) Assignee: Cedar Ridge Research, LLC., New Hope, AL (US)

( * ) Notice: Subject to any disclaimer, the term of this patent is extended or adjusted under 35 U.S.C. 154(b) by 0 days.

(21) Appl. No.: 12/495,462

(22) Filed: Jun. 30, 2009

(65) Prior Publication Data

US 2009/0261093 A1 Oct. 22, 2009

Related U.S. Application Data

(63) Continuation-in-part of application No. 12/476,952, filed on Jun. 2, 2009.

(51) Int. Cl.
*H01F 7/02* (2006.01)
*H01F 7/20* (2006.01)
*B65D 51/00* (2006.01)
*B65D 6/28* (2006.01)

(52) U.S. Cl. ............... 335/306; 335/285; 220/230; 220/612

(58) Field of Classification Search ............. 335/285, 335/302–306; 24/303; 2/102–103, 312, 2/315, 319, 321, 322, 338, 422, 462, 913; 220/230, 612
See application file for complete search history.

(56) References Cited

U.S. PATENT DOCUMENTS

| 381,968 A | 5/1888 | Tesla |
| 493,858 A | 3/1893 | Edison |
| 996,933 A | 7/1911 | Lindquist |
| 1,236,234 A | 8/1917 | Troje |
| 2,389,298 A | 11/1945 | Ellis |
| 2,570,625 A | 10/1951 | Zimmerman et al. |
| 2,722,617 A | 11/1955 | Cluwen et al. |
| 2,932,545 A | 4/1960 | Foley |
| 3,102,314 A | 9/1963 | Alderfer |

(Continued)

FOREIGN PATENT DOCUMENTS

FR 823395 1/1938

(Continued)

OTHER PUBLICATIONS

"BNS Series-Compatible Series AES Safety Controllers" pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—Craig A. Huersten; William J. Tucker

(57) ABSTRACT

A correlated magnetic container and method are described herein that use correlated magnets to enable a container having at least two sections to be assembled, disassembled or releasably secured to an external object. Some examples of the two sections of the container that can be assembled and disassembled utilizing the correlated magnets include a wall panel, top panel, side panel, bottom panel, door panel, a handle, a tool, a belt, a frame member or locking member.

23 Claims, 21 Drawing Sheets

U.S. PATENT DOCUMENTS

| | | | |
|---|---|---|---|
| 3,208,296 A | 9/1965 | Baermann |
| 3,288,511 A | 11/1966 | Tavano |
| 3,468,576 A | 9/1969 | Beyer et al. |
| 3,474,366 A | 10/1969 | Barney |
| 3,802,034 A | 4/1974 | Bookless |
| 4,079,558 A | 3/1978 | Gorham |
| 4,222,489 A | 9/1980 | Hutter |
| 4,453,294 A | 6/1984 | Morita |
| 4,547,756 A | 10/1985 | Miller et al. |
| 4,629,131 A | 12/1986 | Podell |
| 4,941,236 A | 7/1990 | Sherman |
| 5,050,276 A | 9/1991 | Pemberton |
| 5,367,891 A | 11/1994 | Furuyama |
| 5,383,049 A | 1/1995 | Carr |
| 5,631,093 A | 5/1997 | Perry et al. |
| 5,631,618 A | 5/1997 | Trumper et al. |
| 6,072,251 A | 6/2000 | Markle |
| 6,170,131 B1 | 1/2001 | Shin |
| 6,275,778 B1 | 8/2001 | Shimada et al. |
| 6,457,179 B1 | 10/2002 | Prendergast |
| 6,607,304 B1 | 8/2003 | Lake et al. |
| 6,720,698 B2 | 4/2004 | Galbraith |
| 6,847,134 B2 | 1/2005 | Frissen et al. |
| 6,862,748 B2 | 3/2005 | Prendergast |
| 7,066,778 B2 | 6/2005 | Kretzschmar |
| 6,927,657 B1 | 8/2005 | Wu |
| 6,971,147 B2 | 12/2005 | Haltstead |
| 7,362,018 B1 | 4/2008 | Kulogo et al. |
| 7,444,683 B2 | 11/2008 | Prendergast et al. |
| 2004/0003487 A1 | 1/2004 | Reiter |
| 2006/0066428 A1 | 3/2006 | McCarthy et al. |
| 2006/0189259 A1 | 8/2006 | Park |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |
| 2009/0070919 A1* | 3/2009 | Kim ............ 2/319 |

FOREIGN PATENT DOCUMENTS

WO   2007081830 A2   7/2007

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

* cited by examiner

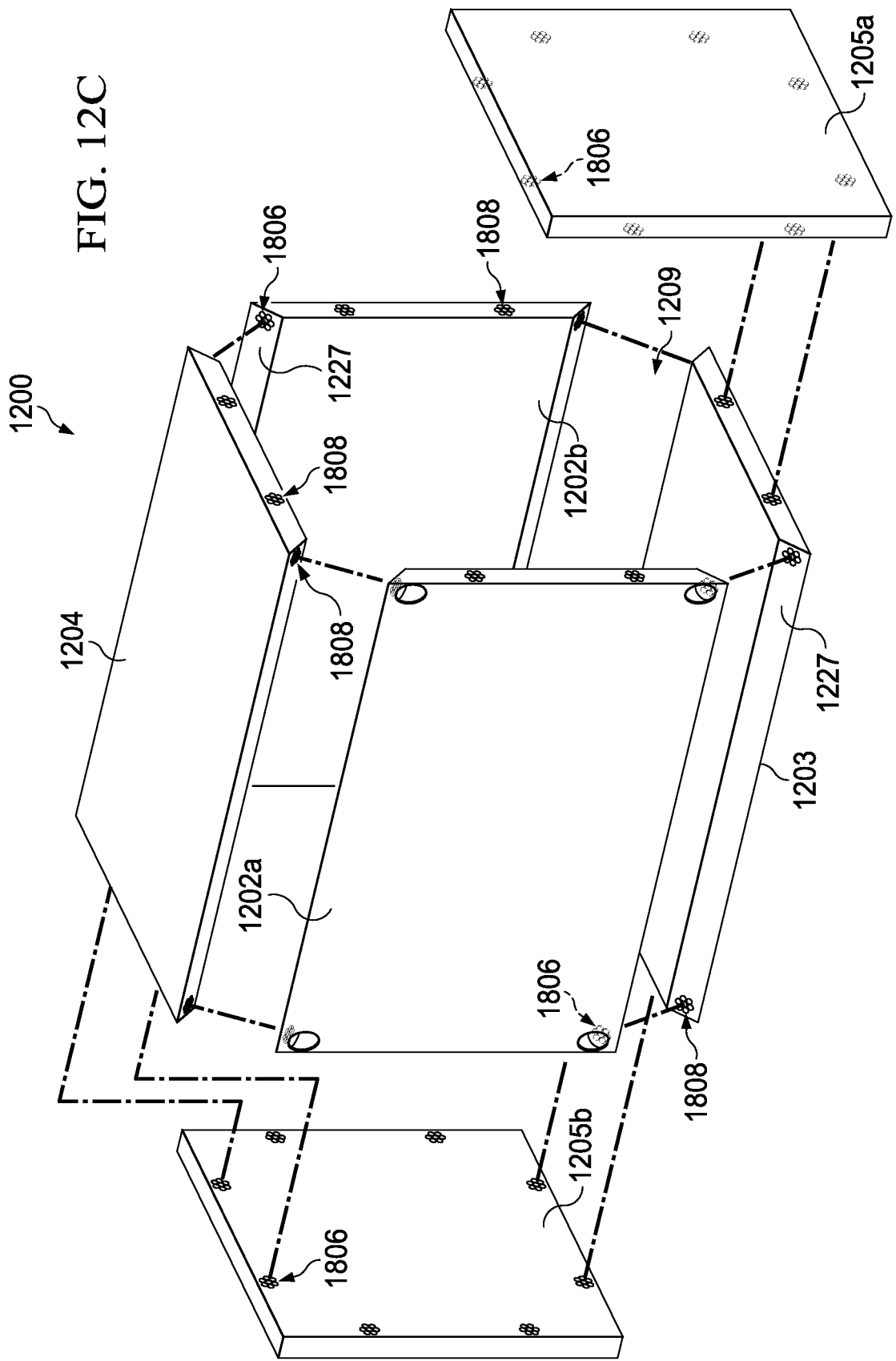

CORRELATED MAGNETIC CONTAINER AND METHOD FOR USING THE CORRELATED MAGNETIC CONTAINER

CROSS REFERENCE TO RELATED APPLICATION

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a container such as but not limited to a shipping crate that uses correlated magnets that enable a user to easily assemble or disassemble one or more elements of the container. Additionally, but not by way of limitation, the container having integrated correlated magnets could be configured such that the correlated magnets provide a user a method to more easily transport the container, assemble the container in a particular orientation, provide coded storage of the container within a storage facility, provide a method of protecting the contents of the container from excessive vibrations, limit access to the internal portion of the container, secure the container to an external object and restrict access to the internal portion of the container.

DESCRIPTION OF RELATED ART

In the logistics field, shipping crates are routinely utilized to temporarily store and secure a variety of goods for transportation via air, rail, road, water, space, etc. The majority of these containers are manufactured to specifications from wood or other material and use traditional fasteners such as screws and/or nails. Upon arrival at its destination it is routine for the recipient to utilize tools such as crowbars or other such devices to open the shipping crate. Typically, during this process at least a portion of the crate is damaged and discarded rendering the crate unusable to deliver goods until the crate has been repaired or rebuilt. Additionally, as most crates are manufactured from wood, they offer little restriction to access as the fasteners that are utilized to assemble the crate can be removed with common hand tools.

Another problem with existing shipping crates is the amount of time and skill required to manufacture the crate for its intended purpose. Many crates are manufactured to certain specifications in order to receive therein a particular object for shipping. Individuals or companies needing to utilize a shipping crate often must hire a specialized company that possesses the skills and tools required to build the crate. Existing shipping crates further offer little protection from vibrations to the objects disposed therein during transport. Current shipping crates will use foam, rubber or other methods to attempt to provide a method of reducing any damage to the goods disposed within the container from vibrations encountered during travel. Packing materials such as foam or rubber can degrade over time or as a result of exposure to moisture or extreme temperatures. Moreover, the recipient of goods shipped in traditional crates will typically discard such packing materials, which end up in landfills or otherwise pollute the Earth's environment.

Accordingly, there has been a need for shipping crate and method manufacturing the shipping crate utilizing correlated magnets to address the aforementioned shortcomings and other shortcomings associated with traditional shipping crates utilized to transport a variety of goods.

SUMMARY

In one aspect, the present invention provides a shipping crate, more specifically but not by way of limitation a shipping crate that has integrally mounted into its walls and/or frame a plurality of correlated magnets configured to facilitate the assembly and/or disassembly of the crate. An exemplary crate functioning to assist a user in assembly or disassembly of the crate in a particular manner or orientation wherein the crate includes more than one wall panel or frame that is designed to be secured to a second mateable wall panel or frame of the crate, wherein the wall panel or frame has integrated therewith a first magnetic field emission structure where the first magnetic field emission structure interacts with a corresponding second magnetic field emission structure that is integrally mounted with the second mateable wall panel or frame, wherein each of the first and second magnetic field emission structures comprise an array of field emission sources each having positions and polarities relating to a desired spatial force function that corresponds to a relative alignment of the first and second magnetic field emission structures within a field domain.

The wall panel or frame can be releasably secured to the second mateable wall panel or frame when the first and second magnetic field emission structures are adjacent one another and have a certain alignment with respect to one another. The wall panel or frame can be released from the second mateable wall panel or frame when the first and second magnetic field emission structures are rotated with respect to one another. This is possible because each field emission source of each array of field emission sources has a corresponding field emission amplitude and vector direction determined in accordance with the desired spatial force function, wherein a separation distance between the first and second magnetic field emission structures and the relative alignment of the first and second magnetic field emission structures creates a spatial force in accordance the desired spatial force function. And, the field domain corresponds to first field emissions from the array of first field emission sources of the first magnetic field emission structure interacting with second field emissions from the array of second field emission sources of the second magnetic field emission structure.

In another aspect, the present invention provides a method for at least partially assembling and disassembling a shipping crate that includes at least the steps of: (a) selecting a first wall panel where the first wall panel has integrally secured therewith a first magnetic field emission structure (b) selecting a second wall panel where the second wall panel has integrally secured therewith a second magnetic field emission structure (c) securing the first wall panel to the second wall panel such that the first magnetic field emission structure of the first wall panel is adjacent to the corresponding second magnetic field emission structure of the second wall panel, where the first wall panel is releasably secured to the second wall panel when the first and second magnetic field emission structures are located proximate one another and have a certain alignment with respect to one another, and where the first and second magnetic field emission structures comprise an array of field emission sources each having positions and polarities relating to a desired spatial force function that corresponds to a relative alignment of the first and second magnetic field emission structures within a field domain (d) disassembling the at least a potion of the shipping crate by rotating the first magnetic field emission structure with respect to the second field emission structure.

Additional aspects of the invention will be set forth, in part, in the detailed description, figures and any claims, which follow, and in part will be derived from the detailed description, or can be learned by practice of the invention. It is to be understood that both the foregoing general description and the following detailed description are exemplary and explanatory only and are not restrictive of the invention as disclosed.

DESCRIPTION OF THE DRAWINGS

A more complete understanding of the present invention may be obtained by reference to the following detailed description when taken in conjunction with the accompanying drawings wherein:

FIG. 12C is an exploded view of an alternative exemplary crate illustrated in FIG. 12A;

DETAILED DESCRIPTION

The present invention is a crate, such as a shipping crate or a storage crate, which utilizes correlated magnetic technology in place of traditional mechanical fasteners to allow a user to easily secure elements of the crate such as walls or frames to each other so as to facilitate the building of the crate in order to be used to transport aid or store an object therein. Utilization of correlated magnetic technology is a significant improvement over conventional fastening devices so an individual can quickly and easily secure the elements of a shipping crate. This significant improvement over the state-of-art is attributable, in part, to the use of an emerging, revolutionary technology that is called correlated magnetics.

Correlated magnetics was first fully described and enabled in the co-assigned U.S. patent application Ser. No. 12/123, 718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358, 423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476, 952 filed on Jun. 2, 2009 and entitled "A Field Emission System and Method". The contents of this document are hereby incorporated herein by reference. Correlated inductance technology, which is related to correlated magnetics technology, is described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic light of the present invention.

Correlated Magnetics Technology

This section is provided to introduce the reader to correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
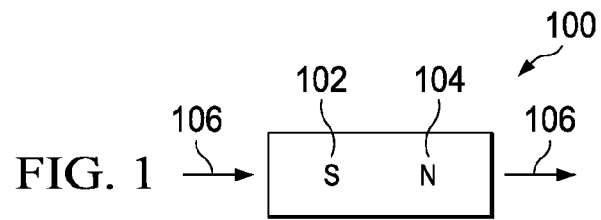
FIGS. 1-9 are various diagrams used to help explain different concepts about correlated magnetic technology which can be utilized in an embodiment of the present Invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 1102 are also referred to herein as positive (+) and negative (−) poles, respectively.

Figure 2A:
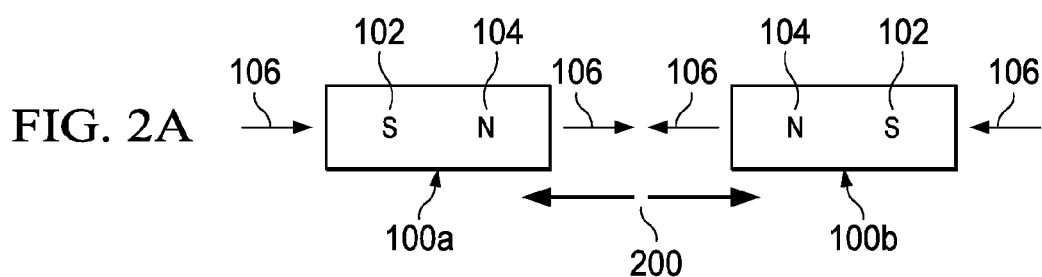
Figure 2B:
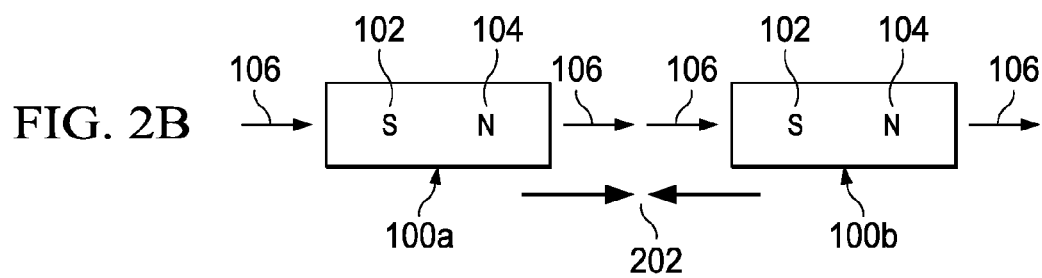
Figure 2C:
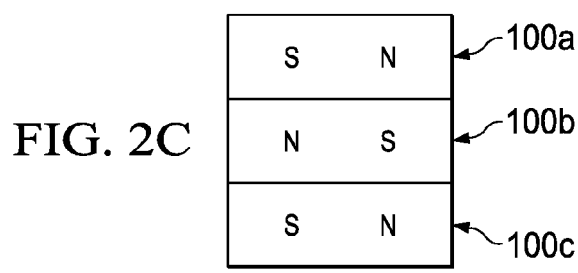

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Figure 3A:
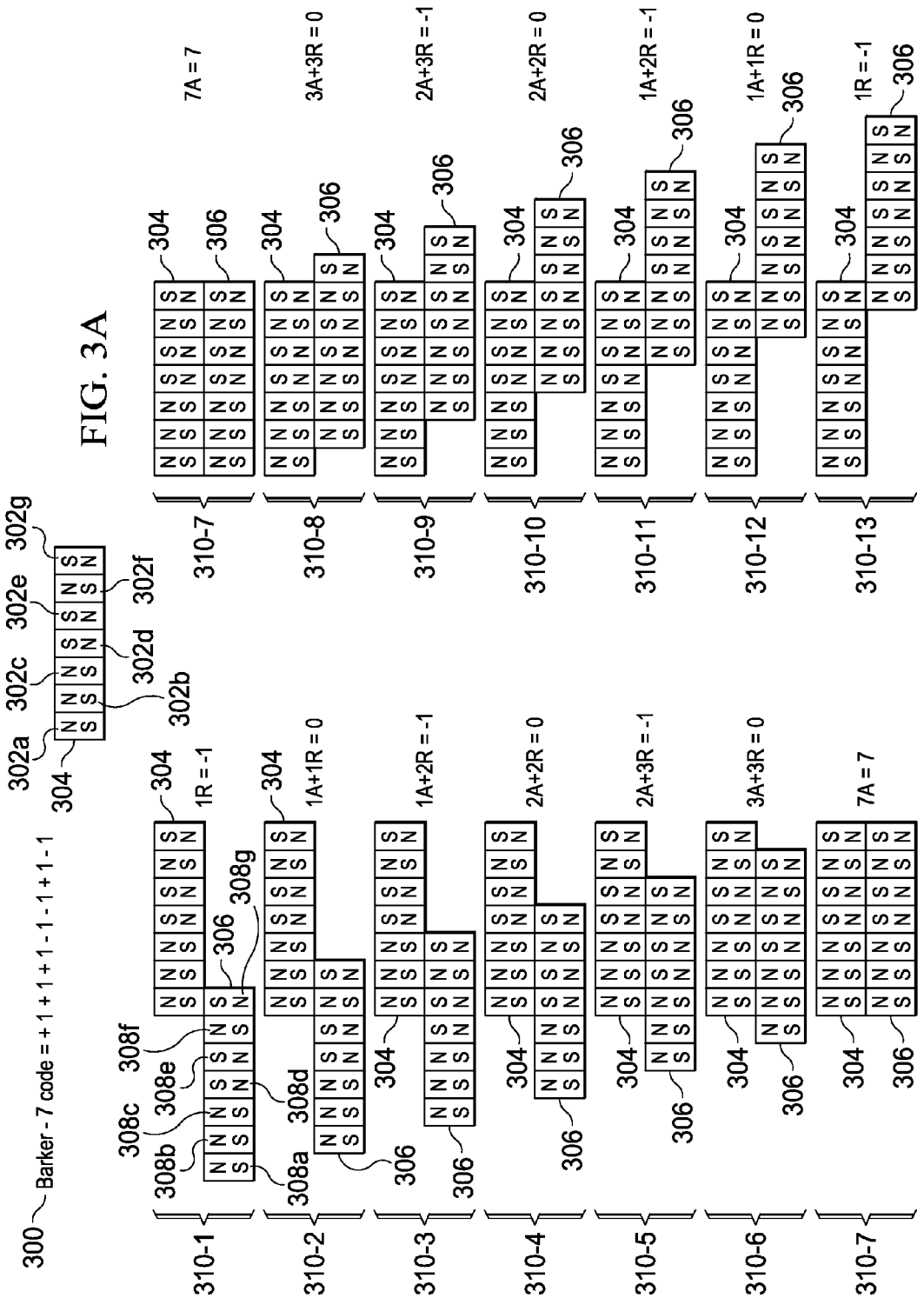

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4A:
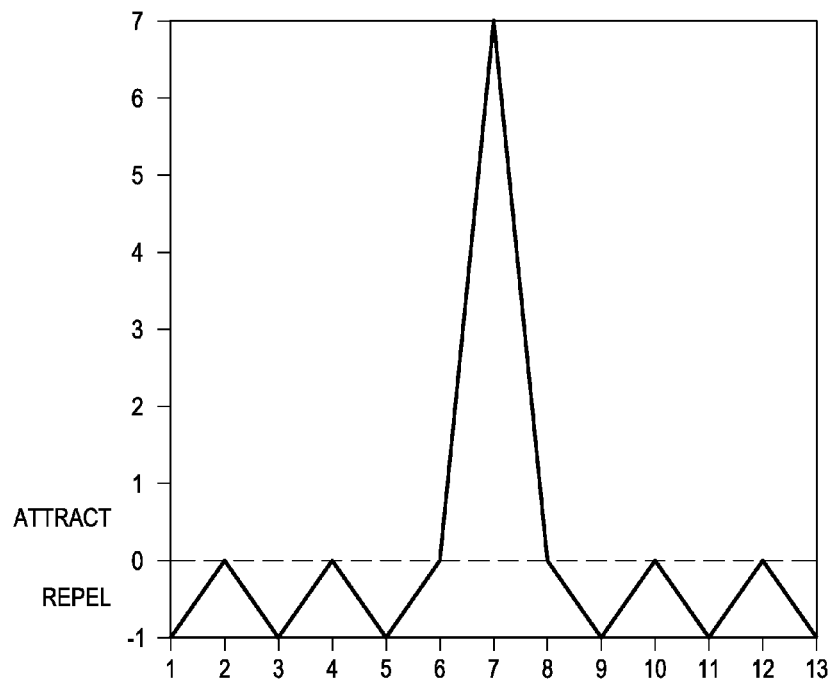
Figure 4A:
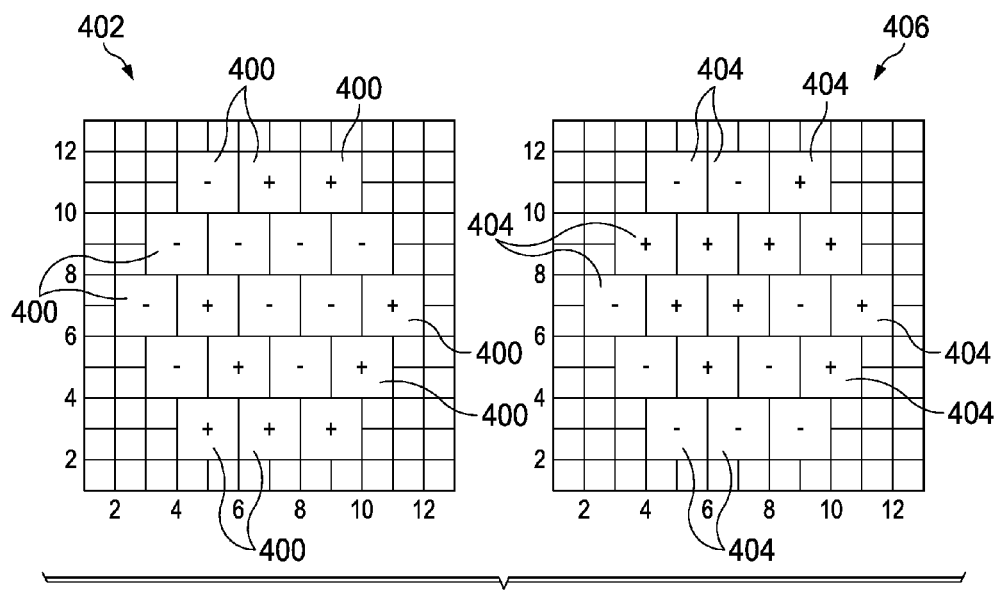
Figure 4B:
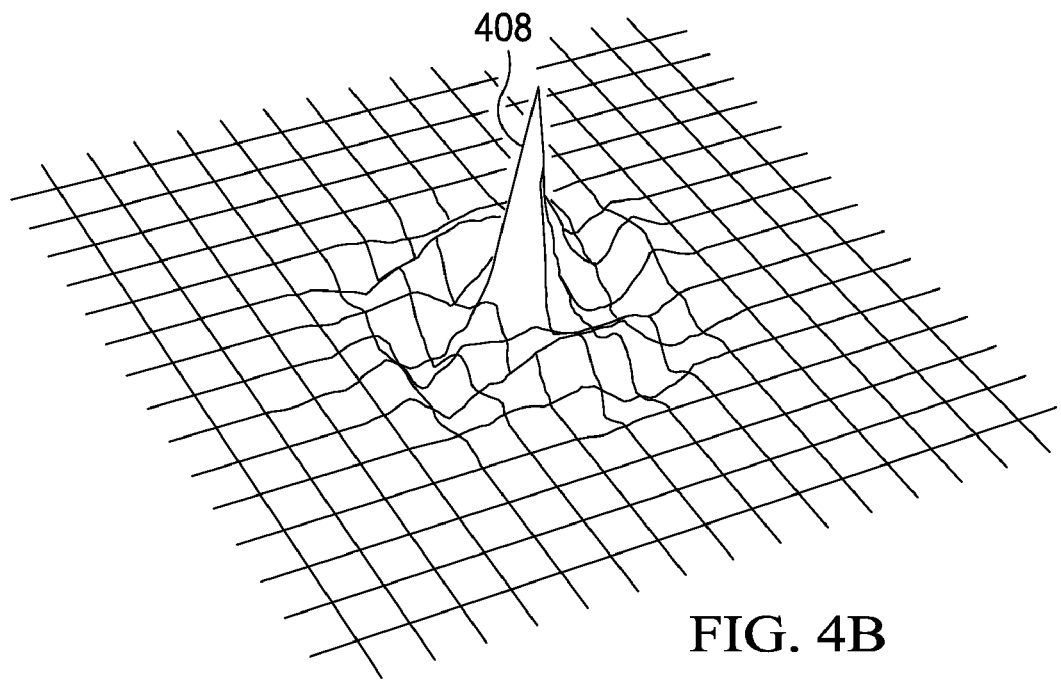
Figure 4C:
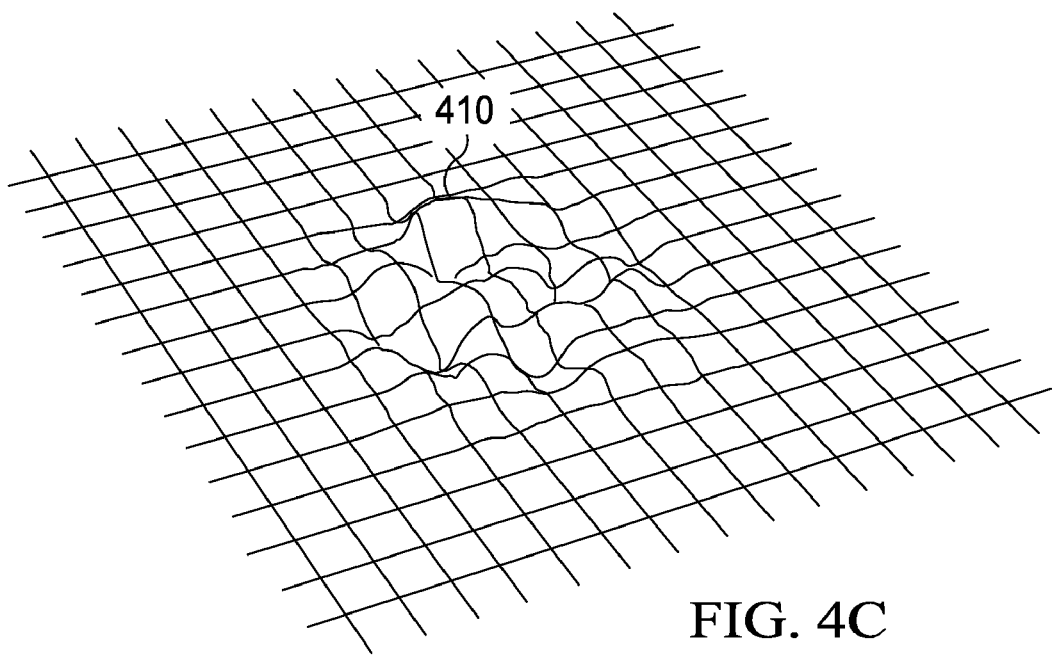

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
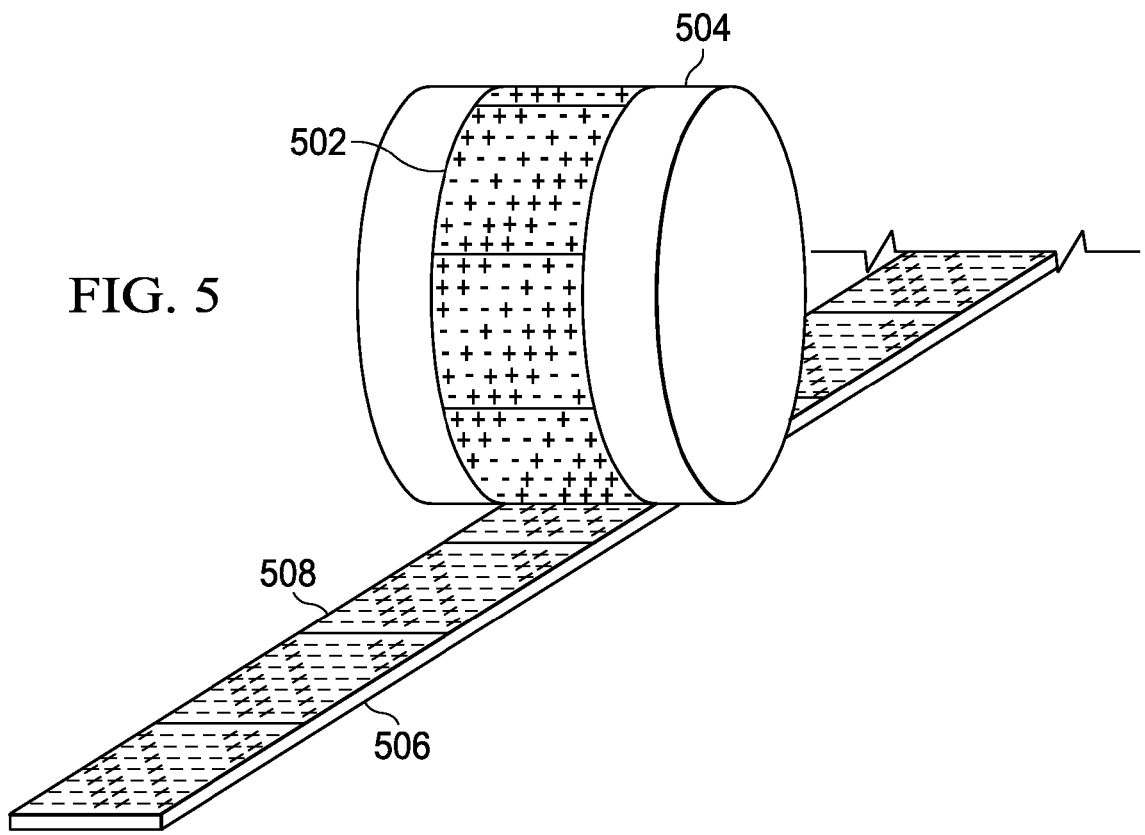

Referring to FIG. 5, there is a diagram depicting a correlating magnet structure 502 being wrapped back on itself on a cylinder 504 (or disc 504, wheel 504) and a conveyor belt/tracked structure 506 having located thereon a mirror image correlating magnet structure 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating structures to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
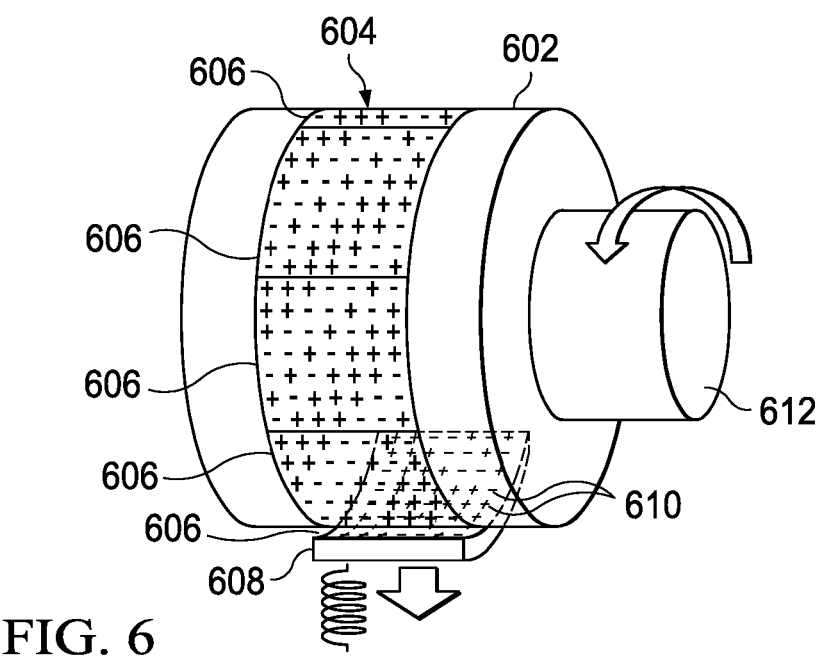

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool, a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
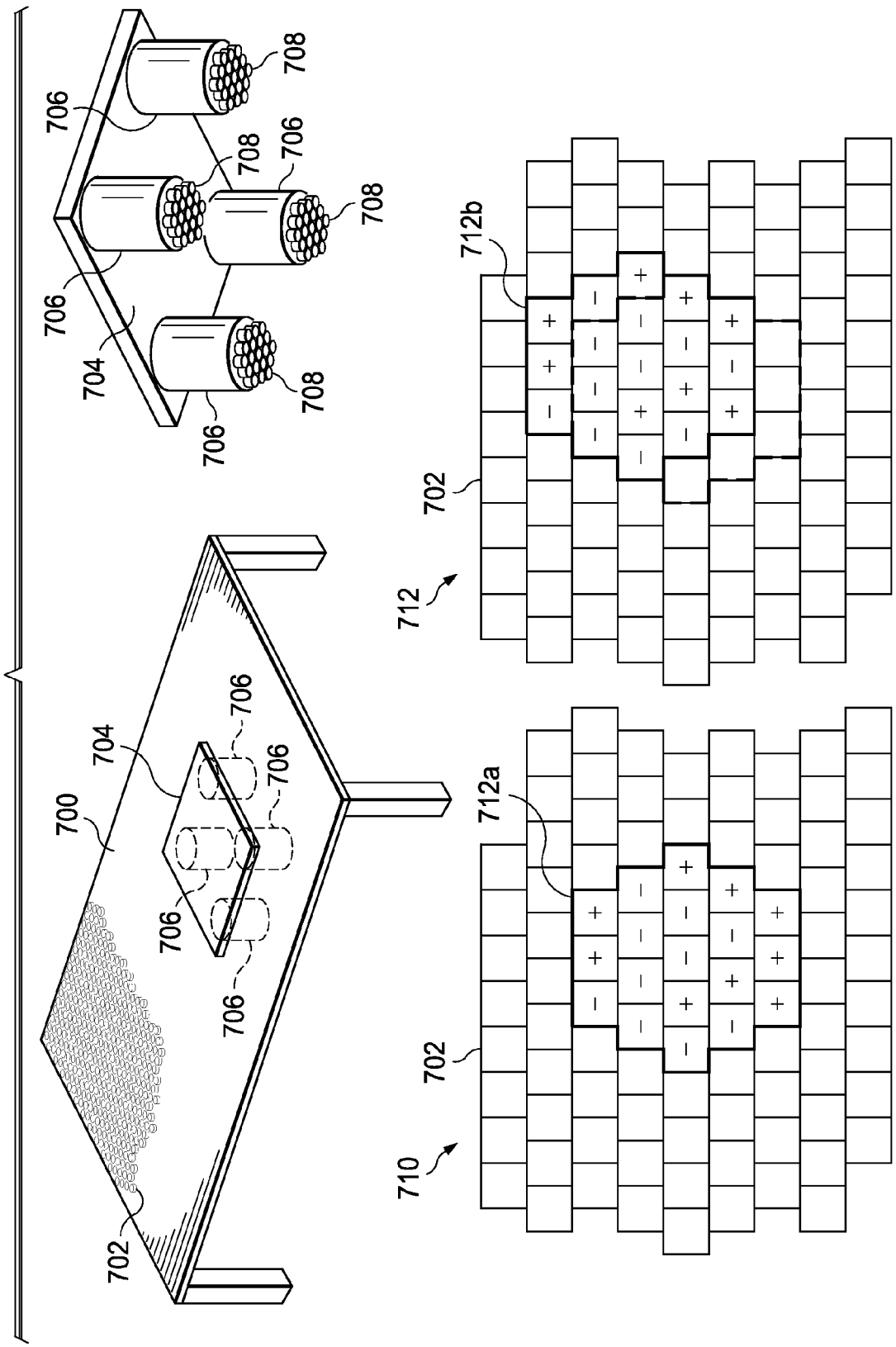

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnet array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
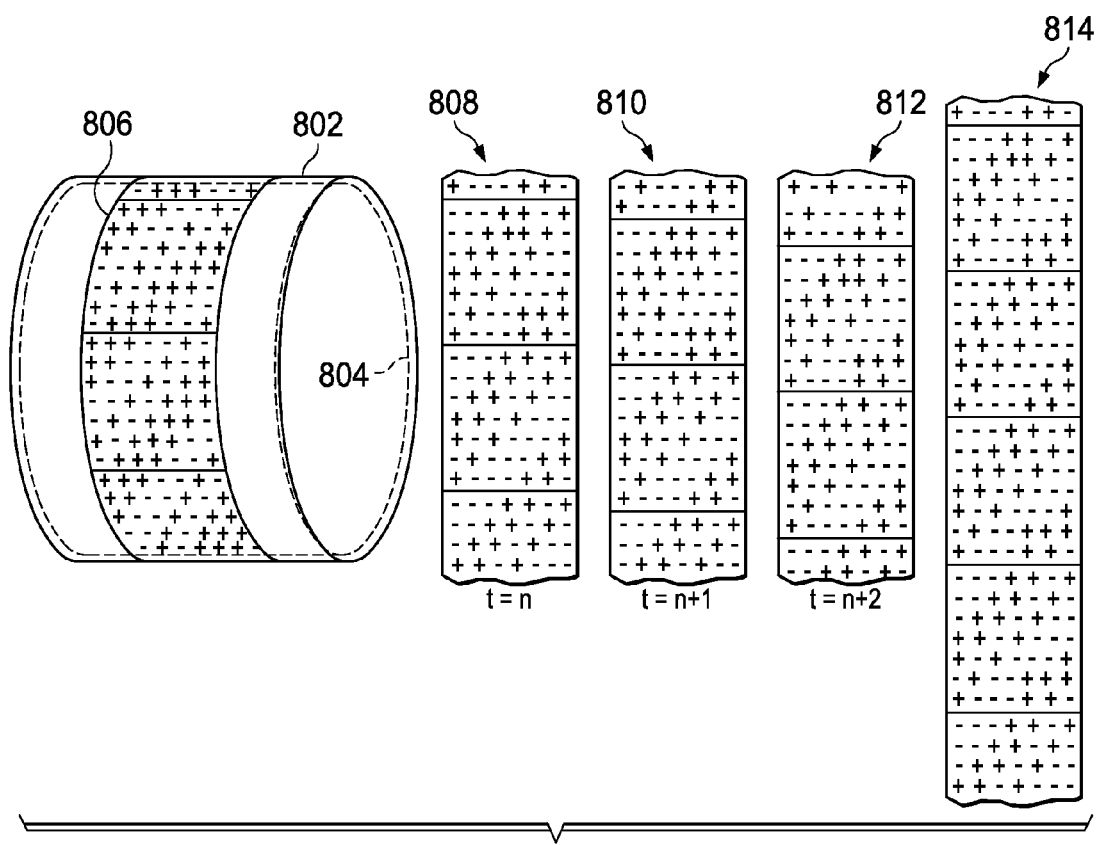

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
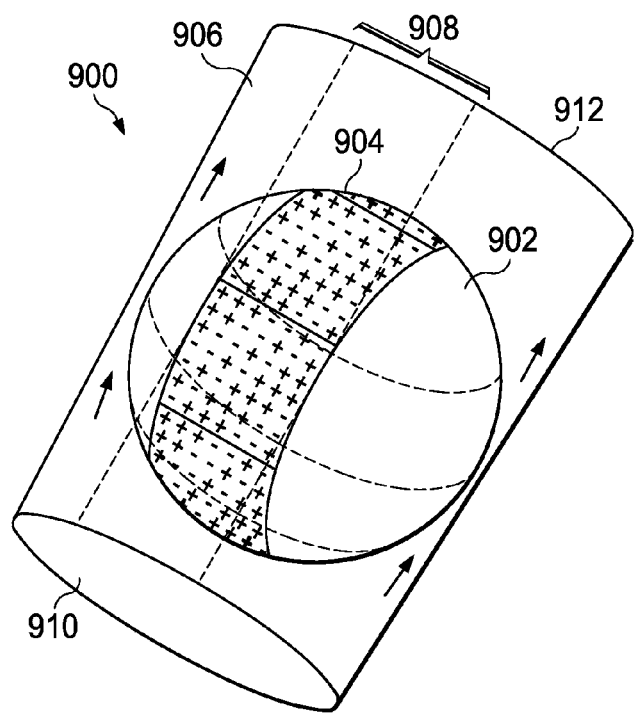

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Correlated Magnetic Shipping Crate

Figure 10:
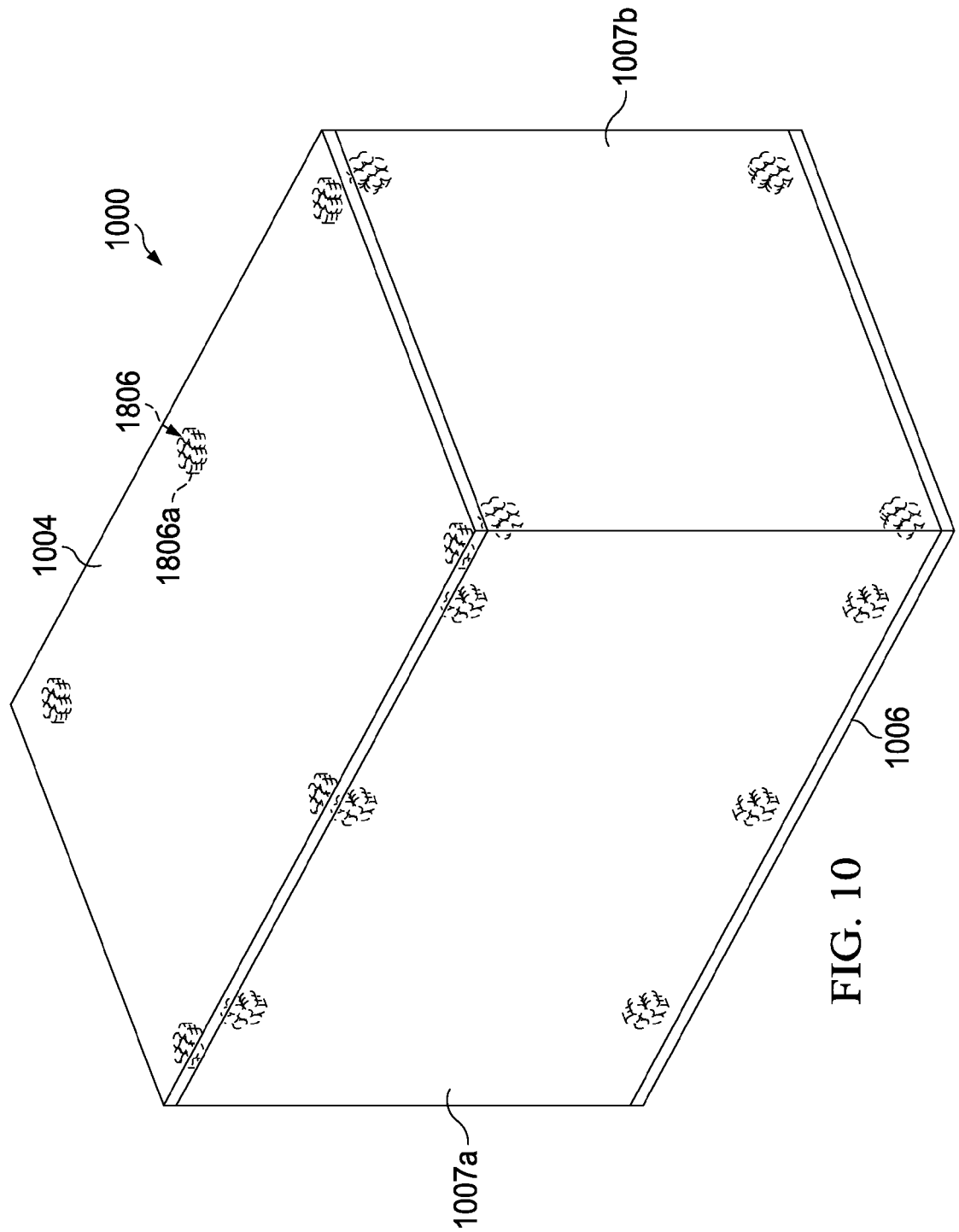
FIG. 10 illustrates an exemplary diagram of an assembled crate in accordance with an embodiment of the present invention.
Figure 11:
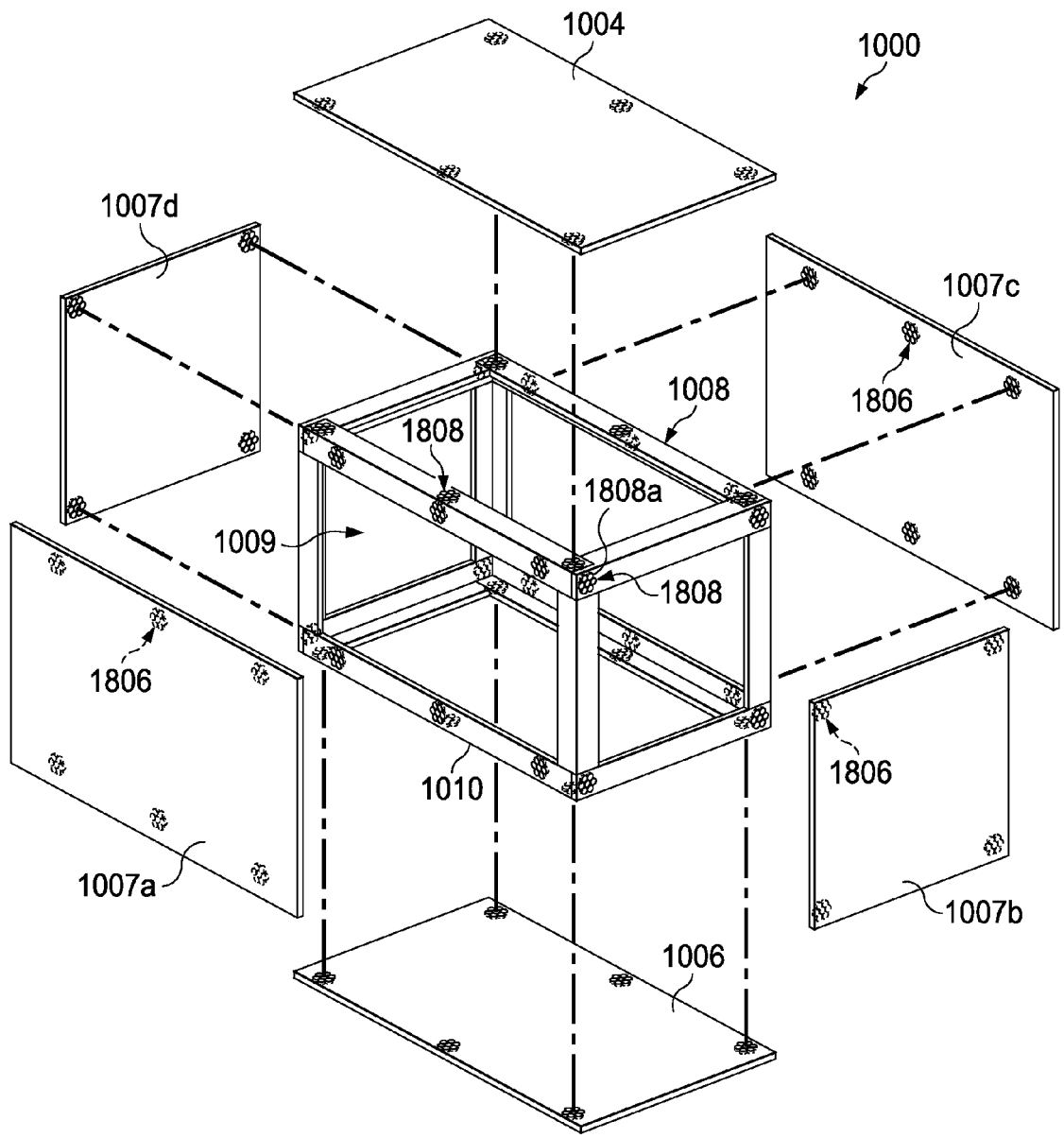
FIG. 11 is an exploded view of the exemplary crate illustrated in FIG. 10.

Referring to FIGS. 10 and 11, there is disclosed a crate 1000. The crate includes a top panel 1004, a bottom panel 1006 and four wall panels 1007a, 1007b, 1007c, 1007d and a frame 1008 in accordance with the present invention. The crate 1000 is substantially hollow and has an interior volume 1009 configured to receive objects therein. Although the exemplary crate 1000 of the present invention is illustrated herein as being configured with a top panel 1004, a bottom panel 1006 and four wall panels 1007a-1007d, it is further contemplated within the scope of the present invention that numerous alternative embodiments of the crate 1000 having multiple shapes could be configured for a wide variety of objects to be disposed therein. Accordingly, the crate 1000 should not be construed in a limited manner.

Still referring in particular to FIGS. 10 and 11, the crate 1000 is manufactured from a suitable durable material such as, but not limited to, metal, wood, or plastic. The top panel 1004, bottom panel 1006 and four wall panels 1007a, 1007b, 1007c, 1007d are configured to be releasably secured to the frame 1008. The frame 1008 further includes support members 1010 that function to provide structural support for the top panel 1004, bottom panel 1006 and four wall panels 1007a, 1007b, 1007c, 1007d.

The support members 1010 are manufactured from a suitable durable material such as, but not limited to, metal, wood or plastic. The support members 1010 are generally elongated and L-shaped but it is contemplated within the scope of the present invention that the support members 1010 could be manufactured in many different shapes.

As illustrated, each of the panels 1004, 1006, 1007a, 1007b, 1007c, 1007d includes a plurality of first magnetic field emission structures 1806, with each of the first magnetic field emission structures 1806 including an array of field emission sources 1806a. As further illustrated, a plurality of second magnetic field emission structures 1808 are integrated with support members 1010 of frame 1008, and correspond to one of the first magnetic field emission structure 1806 of the panels. Each of the second magnetic field emission structures 1808 includes an array of field emission sources 1808a. The first and second magnetic emission structures 1806 and 1808 both have the same code but are a mirror image of one another (see FIG. 4), such that during assembly of the crate 1000 when the first magnetic field emission structures 1806 are located in certain proximity to the second magnetic field emission structures 1808 and they have a certain alignment with respect to one another, peak attraction forces will occur thus enabling the attachment of the panels 1004, 1006 and 1007a-1007d to the support members 1010. Generally, the field emission structures 1806 and 1808 could have many different configurations and could be many different types of permanent magnets, electromagnets, and/or electro-permanent magnets where their size, shape, source strengths, coding, and other characteristics can be tailored to meet different requirements.

Good results have also been achieved when the magnetic field emission structures 1806 and 1808 are coded to promote an exacting and specific orientation when securing the panels 1004, 1006 and 1007a-1007d to the support members 1010. It should be recognized that the frame 1008 could be configured in numerous different shapes and sizes utilizing numerous different amounts of support members 1010 in order to construct alternative embodiments of the crate 1000 of the present invention. Furthermore, the number of magnetic field emission structures utilized to facilitate the assembly of the crate 1000 could be varied depending upon a number of factors, including the size and strength of the magnetic field emissions structures and the size of support members 1010. Additionally, each first and second magnetic field emission structure 1806 and 1808 could be coded and located in a particular configuration to promote a single manner in which to assemble the crate 1000.

It is also contemplated within the scope of the present invention that additional first or second magnetic field emission structures 1806 and 1808 could be utilized to facilitate the connection of the crate 1000 to another object with a corresponding first or second magnetic field emission structure respectively.

Depending on materials used, manufacturing reasons, or other reasons, the first and second magnetic field emission structures 1806, 1808 may be integrally mounted on an inside surface, an outside surface, and/or within a material used to produce the frame 1008 or top panel 1004, bottom panel 1006 and four wall panels 1007a, 1007b, 1007c, 1007d. Therefore, such structures may not actually be visible to the user as illustrated herein.

The assembly and disassembly of the crate 1000 is possible because each of the first and second magnetic field emission structures 1806 and 1808 comprise the array of field emission sources 1806a and 1808a respectively (e.g., an array of magnets) each having positions and polarities relating to a desired spatial force function that corresponds to a relative alignment of the first and second magnetic field emission structures 1806 and 1808 within a field domain (see discussion about correlated magnet technology). When a user places a top panel 1004, bottom panel 1006 or one of the four wall panels 1007a, 1007b, 1007c, 1007d proximate to a support member 1010, a peak spatial attraction force occurs between the first and second magnetic emission structures 1806, 1808 such that the selected panel and support member 1010 are moved towards and secured to each other.

To facilitate the separation of the first and second magnetic field emission structures 1806, 1808 from each other, and thus the disassembly of the crate 1000, one or both of the first and second magnetic field emission structures 1806 and 1808 could be rotatably mounted so as to allow the misalignment of the first and second magnetic field emission structures 1806, 1808 with respect to each other as described below in reference to FIGS. 18A-18I and FIGS. 19A-19C. One skilled in the art would also recognize that the first and second magnetic field emission structures 1806, 1808 can also be detached by applying a pull force, shear force, or any other force sufficient to overcome the attractive peak spatial force between the substantially aligned first and second field emission structures 1806, 1808.

It is further contemplated within the scope of the present invention that either of first and second magnetic field emission structures 1806, 1808 could have mounted thereto a pin, knob or other release mechanism so as to provide a user an interface for rotating one of the magnetic field emission structures 1806, 1808 with respect to the other.

It is further contemplated to be within the scope of this invention, that each of the support members 1010 of the frame 1008 could be assembled together utilizing first and second magnetic field emission structures in a similar fashion as the assembly of the crate 1000.

Figure 12A:
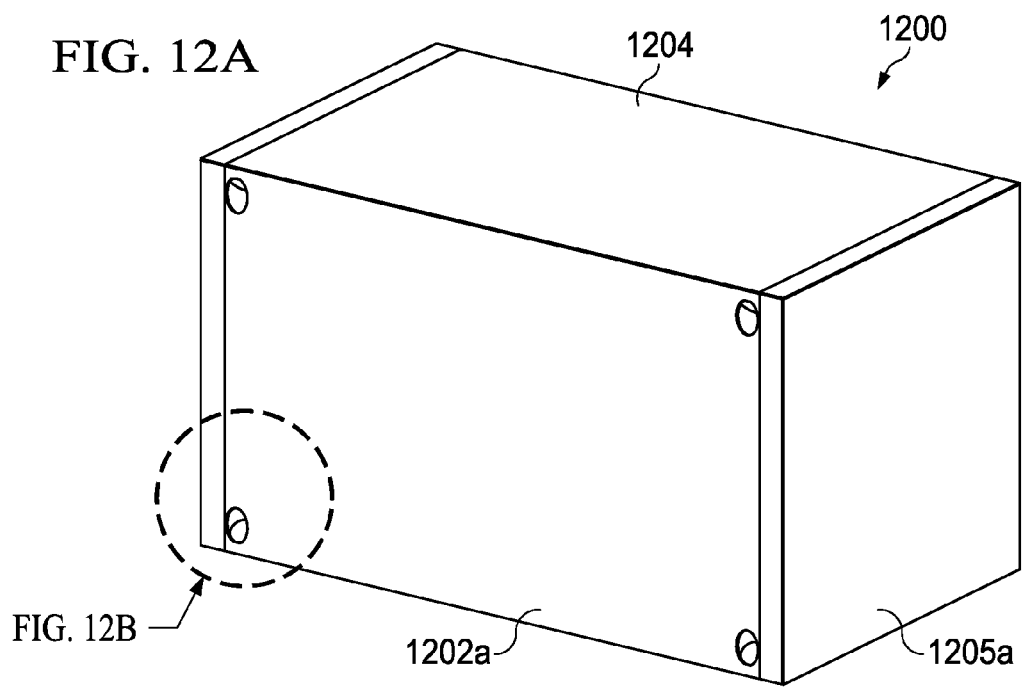
FIG. 12A illustrates an alternative exemplary assembled crate in accordance with an embodiment of the present invention.
Figure 12B:
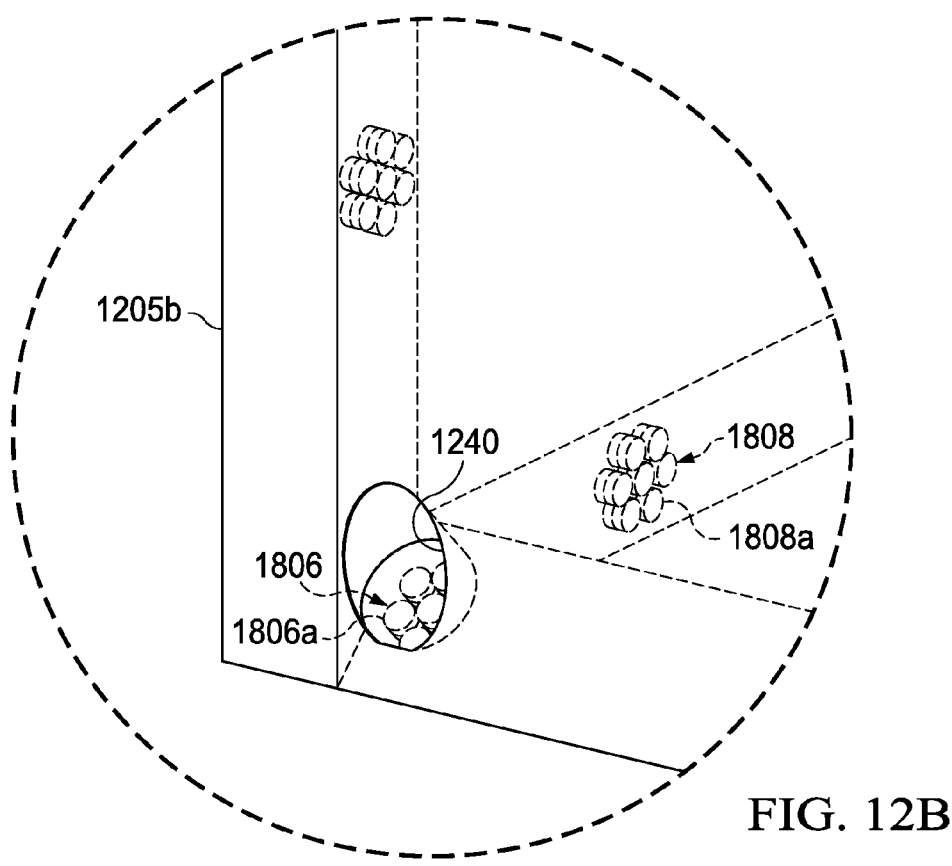
FIG. 12B is a detailed view of the corner of the crate shown in FIG. 12A.

Referring now to FIGS. 12A through 12C, there is illustrated an alternative exemplary embodiment of a crate 1200 configured to be assembled and disassembled utilizing first and second magnetic field emission structures 1806, 1808 with no internal frame. The crate 1200 includes of two side panels 1202a and 1202b, a top panel 1204, a bottom panel 1203 and two end panels 1205a and 1205b. The crate 1200 is substantially hollow and has an interior volume 1209 configured to receive objects therein. Although the alternative exemplary crate 1200 of the present invention is illustrated herein as being configured with two side panels 1202a and 1202b, a top panel 1204, and a bottom panel 1203 and two end panels 1205a and 1205b, it is further contemplated within the scope of the present invention that numerous embodiments of the crate 1200 could be configured in numerous different shapes in order to substantially enclose a variety of objects to be disposed therein. More specifically but not by way of limitation, the crate 1200 could be configured such that either a greater or fewer amount of panels could be used to assemble alternative embodiments of a crate 1200 in order to substantially enclose a desired object for storage or transportation. Those skilled in the art should recognize that the crate 1200 could be manufactured from numerous different suitable and durable materials.

Each of the two side panels 1202a and 1202b, top panel 1204 and bottom panel 1203 include angular edges on opposing sides, such as edge 1227. The angular edges 1227 of the two side panels 1202a and 1202b function to provide a mateable structural shape for the side panels 1202a and 1202b such that when placed adjacent either the top panel 1204 or bottom panel 1203 a union is produced therebetween. The angular edges 1227 function to provide structural support to the crate 1200 in lieu being attached to an internal frame or other method of support. While the angular edges 1227 are approximately forty-five degrees, those skilled in the art will recognize that numerous degrees of mateable angular edges 1227 could be utilized when constructing a crate 1200 of different shapes and sizes.

Integrally mounted with the two side panels 1202a and 1202b, a top panel 1204, and a bottom panel 1203 and two end panels 1205a and 1205b are a plurality of first and second magnetic field emission structures such as 1806 and 1808. Each of the first and second magnetic field emission structures 1806 and 1808 include an array of field emission sources 1806a and 1808a. The first and second magnetic field emission structures 1806 and 1808 that are integrally mounted proximate the angular edges 1227 in the two side panels 1202a and 1202b, top panel 1204 and bottom panel 1203 and function to attach the aforementioned together are mounted generally parallel with their respective angular edge 1227 such that when adjacent one another the first and second magnetic emission structures 1806 and 1808 are generally parallel to each other.

While the crate 1200 illustrated herein shows a plurality of first and second magnetic field emission structures 1806 and 1808 integrally mounted thereon, those skilled in the art should recognize that any number of first and second magnetic field emission structures could be utilized to assemble the crate depending upon but not by way of limitation the size of the crate, strength of the magnetic field emission structures, materials used or manufacturing reasons. It should also be recognized that the first and second magnetic field emission structures 1806 and 1808 are mounted in the two side panels 1202*a* and 1202*b*, a top panel 1204, and a bottom panel 1203 and two end panels 1205*a* and 1205*b* so as to promote the proper orientation and attachment of the aforementioned. It is contemplated within the scope of the present invention that a particular mounting and location of the first and second magnetic field emission structures is not required but it is desirable that the first and second magnetic field emission structures 1806, 1808 be mounted in the various aforementioned panels such that it promotes the assembly of the crate 1200 utilizing the properties of the first and second magnetic field emission structures 1806, 1808 as discussed herein. Depending on materials used, manufacturing reasons, or other reasons, first and second magnetic field emission structures 1806 and 1808 may be integrally mounted on an inside surface, an outside surface, and/or within a material used to produce the crate 1200. Therefore, such structures may not actually be visible to the user as illustrated herein.

The assembly and disassembly of the crate 1200 is possible because each of the first and second magnetic field emission structures 1806 and 1808 comprise of an array of field emission sources 1806*a* and 1808*a* respectively (e.g., an array of magnets) each having positions and polarities relating to a desired spatial force function that corresponds to a relative alignment of the first and second magnetic field emission structures 1806 and 1808 within a field domain (see discussion about correlated magnet technology). When a user places any of the two side panels 1202*a* and 1202*b*, top panel 1204, bottom panel 1203 or two end panels 1205 proximate to one another and the first and second magnetic emission field structures 1806 and 1808 are in relative alignment a peak spatial attraction force occurs between the first and second magnetic emission structures 1806 and 1808 such that the assembly of the crate 1200 is achieved.

To facilitate the separation of the first and second magnetic field emission structures 1806 and 1808 from each other, and thus the disassembly of the crate 1200, one or both of magnetic field emission structures 1806 and 1808 would be rotatably mounted so as to allow the offset of the magnetic field emission structures 1806 and 1808 with respect to each other as described below in reference to FIGS. 18A-18I and FIGS. 19A-19C.

As shown in particular in FIG. 12B a chamber 1240 is bored partially through the side panels 1202*a* and 1202*b* from the exterior surface 1241 in order to provide access to the magnetic field emission structure 1806. This chamber 1240 functions to provide access to the first magnetic filed emission structure 1806 as the first magnetic field emission structure 1806 are mounted proximate and generally parallel with the angular edge 1227. The access to the first magnetic field emission structure 1806 provided by the chamber 1240 permits any desired rotation of the magnetic field emission structure 1806.

It is further contemplated within the scope of the present invention that either of first and second magnetic field emission structures 1806 and 1808 could have mounted thereto a pin, knob or other release mechanism so as to provide a user an interface for rotating one of the magnetic field emission structures 1806 and 1808 with respect to the other. Additionally, it is contemplated within the scope of the invention that the magnetic field emission structures 1806 and 1808 integrally mounted within the crate 1200 could be coded in such a manner to promote a single manner of assembly of the crate 1200.

Figure 13:
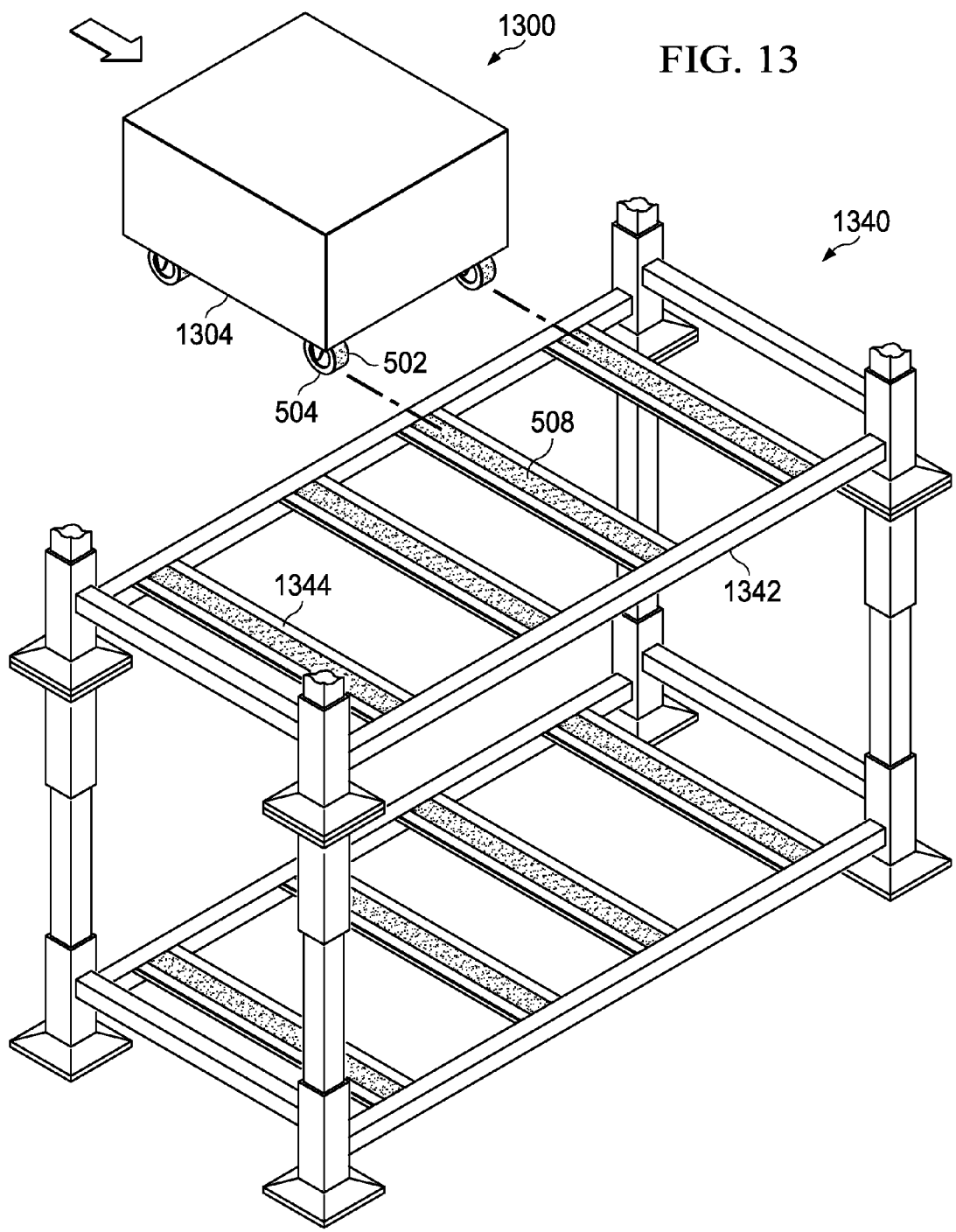
FIG. 13 is a perspective view of an alternative exemplary crate and storage rack in accordance with an embodiment of the present invention.

Referring now in particular to FIG. 13 there is illustrated an alternative exemplary embodiment of a crate 1300 and a storage rack 1340 wherein first and second magnetic field emission structures 502 and 508 are utilized to provide secure and/or coded storage for the crate 1300. The crate 1300 as shown is constructed in a conventional shape to have an interior volume in order to receive objects therein. Those skilled in the art will recognize that numerous different shapes and configurations of crate 1300 could be utilized. Rotatably mounted to the bottom 1304 of the crate 1300 are wheels 504. The wheels 504 operate as described in FIG. 5 wherein the wheels 504 have an external surface comprising a correlated first magnetic field emission structure 502 being substantially disposed around wheel 504.

The crate 1300 is configured to engage with the storage rack 1340. The storage rack consists of a plurality of support members 1342 constructed in a manner so as to receive and support a crate 1300. The support members 1340 further include a plurality of support beams 1344 that are generally mounted in a configuration so as to receive the wheels 504 of the crate 1300. The support beams 1344 have disposed thereon a correlated second magnetic field emission structure 508 that is a mirror image to the correlated first magnetic field emission structure 502 that is disposed on the wheel 506 and may comprise one or more code modulos of the code corresponding to the first field emission structure. When the wheel 506 is superposed on the support beam 1344 and traversed across by some external force the fixed first and second magnetic field emission structures 502 and 508 provide a traction and gripping force as the wheel traverses along the support beam 1344. The gripping force remains substantially constant as the wheels 504 traverses across the support beam 1344 independent of friction or gravity. The gripping force provides assistance to the user so that the crate 1300 stays engaged with the storage rack 1340 ensuring proper and secure placement during the process of storing the crate 1300.

It is further contemplated within the scope of the present invention that the first and second magnetic field emission structures 502 and 508 could be coded so as to promote placement of a particular crate 1300 in a particular location on the storage rack 1344. Those skilled in the art should recognize that numerous configurations or alternative embodiments of the wheels 504 and the support beams 1344 could be utilized to configure a system as described herein.

More specifically but not by way of limitation, the crate 1300 could have only one rotatably mounted correlated magnetic field emission structure configured to engage with the storage rack. Also, the support beams 1344 configuration illustrated herein configured to receive the wheels 504 could be constructed in numerous different manners to receive a rotatably mounted magnetic field emission structure of the crate. More specifically but not by way of limitation a solid shelf could be used having strips of magnetic field emission structures disposed thereon.

Figure 14A:
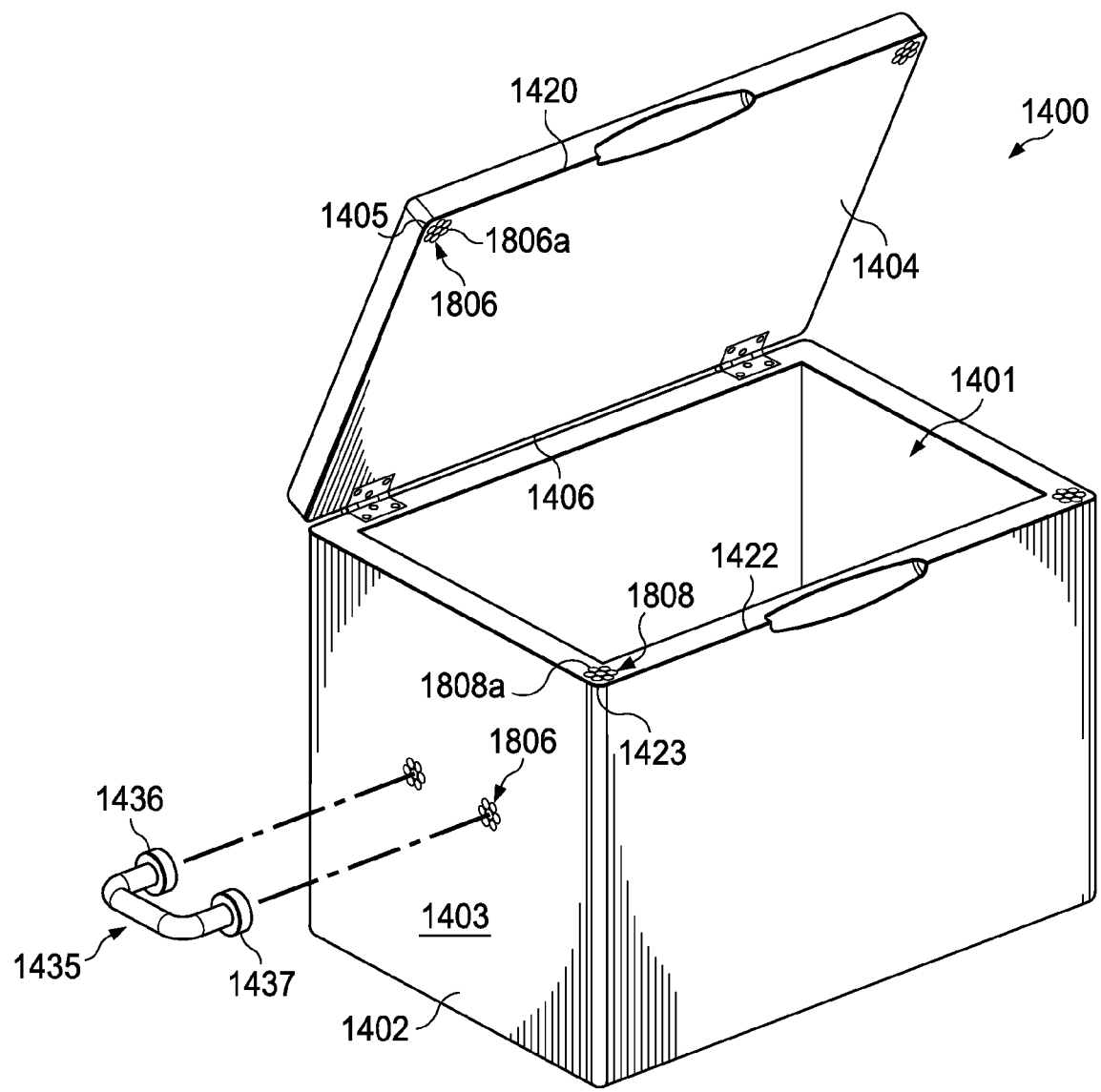
FIG. 14A in a perspective view of yet another alternative exemplary crate in accordance with an embodiment of the present invention.

Referring now to FIG. 14A there is illustrated an alternative exemplary embodiment of a crate 1400 wherein magnetic field emission structures are utilized to provide restricted access to the interior of the crate 1400. Additionally, magnetic field emission structures are utilized to provide a method of releasably securing a handle to assist in transportation of the crate 1400 by a user. The crate 1400 further includes a plurality of walls 1402 configured to form a generally rectangular shape having an interior volume for receiving objects therein. A top member 1404 is hingedly attached along a peripheral edge 1406 allowing a user access to the interior volume 1401 of the crate 1400.

Integrally mounted proximate the corners 1405 along the edge 1420 are first magnetic field emission structures 1806. The first magnetic field emission structures 1806 further include an array of field emission sources 1806a. Mounted along the upper edge 1422 of the walls of the crate 1400 and proximate the corners 1423 are a pair of second magnetic field emission structures 1808. The second magnetic field emission structures 1808 include an array of field emission sources 1808a.

The first and second magnetic emission structures 1806 and 1808 both have the same code but are a mirror image of one another (see FIG. 4), such that when closing the top member 1404 when the first magnetic field emission structure 1806 is located in certain proximity to the second magnetic field emission structure 1808 and has a certain alignment with respect to one another, a peak attraction force will occur thus enabling the attachment of the top member 1404 along its edge 1420 to the edge 1422 of the crate 1400. The attachment and de-attachment of the top member 1404 to the crate 1400 is possible because each of the magnetic field emission structures 1806 and 1808 comprise of an array of field emission sources 1806a and 1808a respectively (e.g., an array of magnets) each having positions and polarities relating to a desired spatial force function that corresponds to a relative alignment of the magnetic field emission structures 1806 and 1808 within a field domain (see discussion about correlated magnet technology).

When a user places the top member 1404 such that the edge 1420 is proximate to upper edge 1422 a peak spatial attraction force occurs between the magnetic emission structures 1806 and 1808 such that the top member 1404 is moved towards the upper edge 1422 and secured. To facilitate the separation of magnetic field emission structures 1806 and 1808 from each other, and thus the de-attachment of the top panel 1404, one or both of magnetic field emission structures 1806 and 1808 would be rotatable so as to allow the offset of the magnetic field emission structures 1806 and 1808 with respect to each other as described below in reference to FIGS. 18A-18I and FIGS. 19A-19C.

It is contemplated within the scope of the present invention that the magnetic emission structures 1806 and 1808 be rotatably mounted such that they would require a third magnetic field emission structure to rotate either the magnetic field emission structure 1806 and 1808. This would enable a user only in possession of a coded third magnetic field emission structure to access the interior volume of the crate 1400 essentially utilizing the magnetic emission structures as a lock and key configuration.

Those skilled in the art should recognize that although the crate 1400 illustrated herein depicts a certain number of magnetic field emission structures any number of magnetic field emission structures could be utilized to perform the functions as described herein for crate 1400. The crate 1400 could be manufactured in numerous different embodiments to perform a variety of function such as but not limited to an ice chest, freezer or wardrobe chest.

The crate 1400 includes two first magnetic field emission structures 1806 integrally mounted into the side panel 1403. A handle 1435 configured to have two rotatably mounted ends 1436, 1437 is releasably secured to the side panel 1403 when a user desires to transport the crate 1400. Although not illustrated herein, integrally mounted into the ends 1436, 1437 are second magnetic field emission structures 1808 that further include an array of field emission sources. The second magnetic field emission structures 1808 that are disposed within the ends 1436, 1437 have the same code but are a mirror image of the first magnetic field emission structures 1806 such that when placing the handle 1435 proximate the side panel 1403 and the first magnetic field emission structure 1806 is located in certain proximity to the second magnetic field emission structure 1808 in the ends 1436, 1437 and has a certain alignment with respect to one another, a peak attraction force will occur thus enabling the attachment of the handle 1435 to the side panel 1403. The attachment and de-attachment of the handle 1435 to the side panel 1435 is possible because each of the first and second magnetic field emission structures 1806 and 1808 comprise of an array of field emission sources each having positions and polarities relating to a desired spatial force function that corresponds to a relative alignment of the magnetic field emission structures within a field domain (see discussion about correlated magnet technology).

Figure 14B:
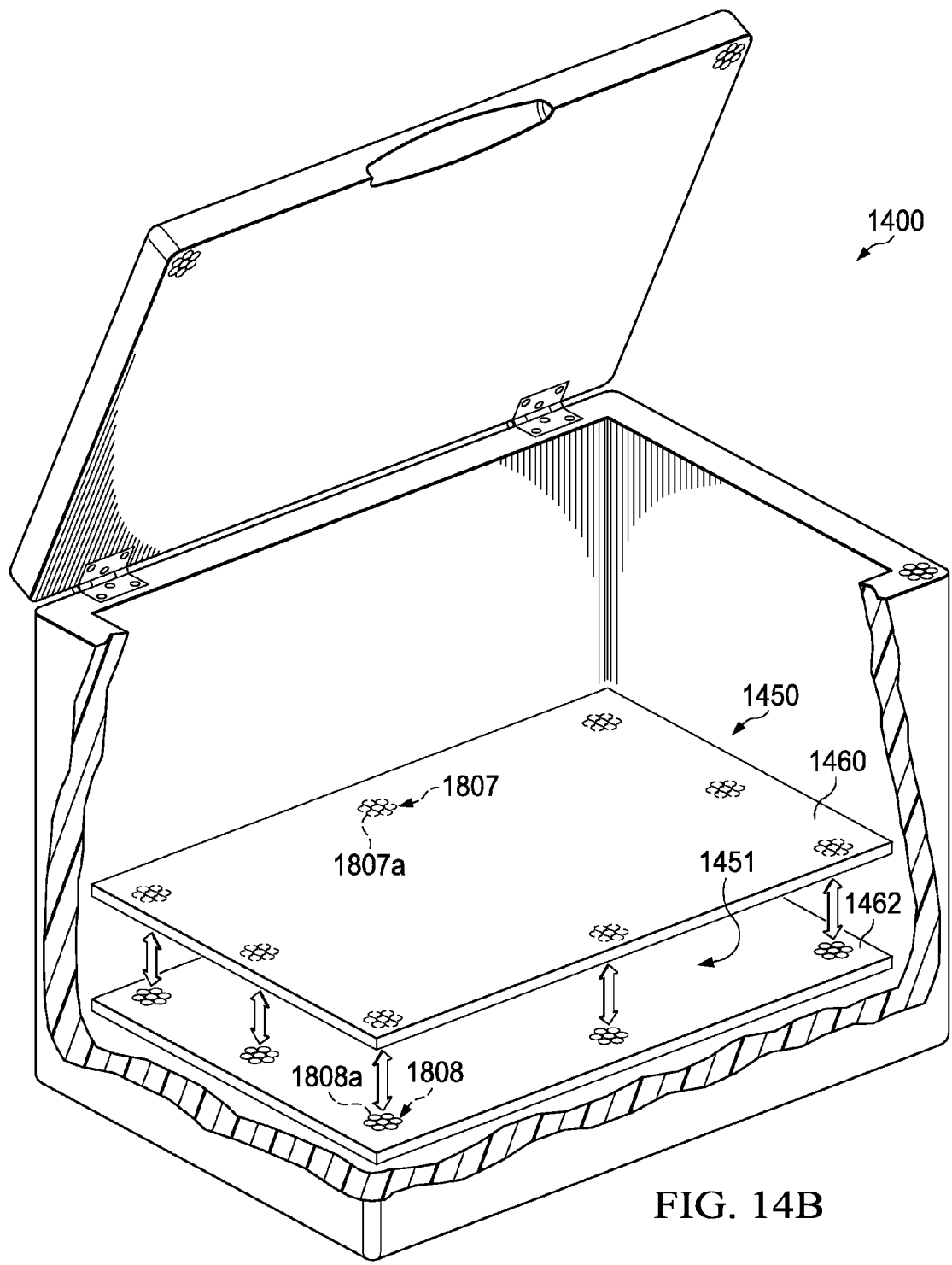
FIG. 14B is a exposed view of the alternative exemplary crate shown in FIG. 14A having a floating floor in accordance with an embodiment of the present invention.

Now referring in particular to FIG. 14B, the exposed view of the crate 1400 shows the floor 1450 having a first layer 1460 superposed over a second layer 1462. Integrally mounted into the first layer 1460 is a plurality of first magnetic field emission structures 1807. The magnetic field emission structures further include an array of field emission sources 1807a. The second layer 1462 further includes a plurality of second magnetic field emission structures 1808. The second magnetic field emission structures 1808 further include an array of field emission sources 1808a. The magnetic field emission structures 1807 and 1808 are configured with an array of field emission sources 1807a, 1808a each having positions and polarities relating to produce a desired spatial force function that repels the first and second magnetic field emission structures 1807, 1808 in opposite directions from each other when proximate one another.

As the first layer 1460 is repelled away from the second layer 1462, the walls 1402 provide for the first layer 1460 to be retained within the crate 1400 and remain substantially suspended over the second layer 1462. The repel spatial force function present between the magnetic field emission structures 1807 and 1808 causes the first layer 1460 to hover over the second layer 1462 creating a gap 1451 there-between. The gap 1451 intermediate the first layer 1460 and second layer 1462 functions to significantly reduce the vibrations that reach any object that is superposed on the first layer 1460 during transportation. It is contemplated within the scope of the present invention that the first layer 1460 and second layer 1462 could utilize numerous different amounts of magnetic field emission structures 1807 and 1808 to perform the function as described herein. Furthermore the size and amounts of the magnetic field emission structures 1807 and 1808 could be varied in order to accommodate different weights of objects on the first layer 1460 and retain the void 1451.

Figure 15A:
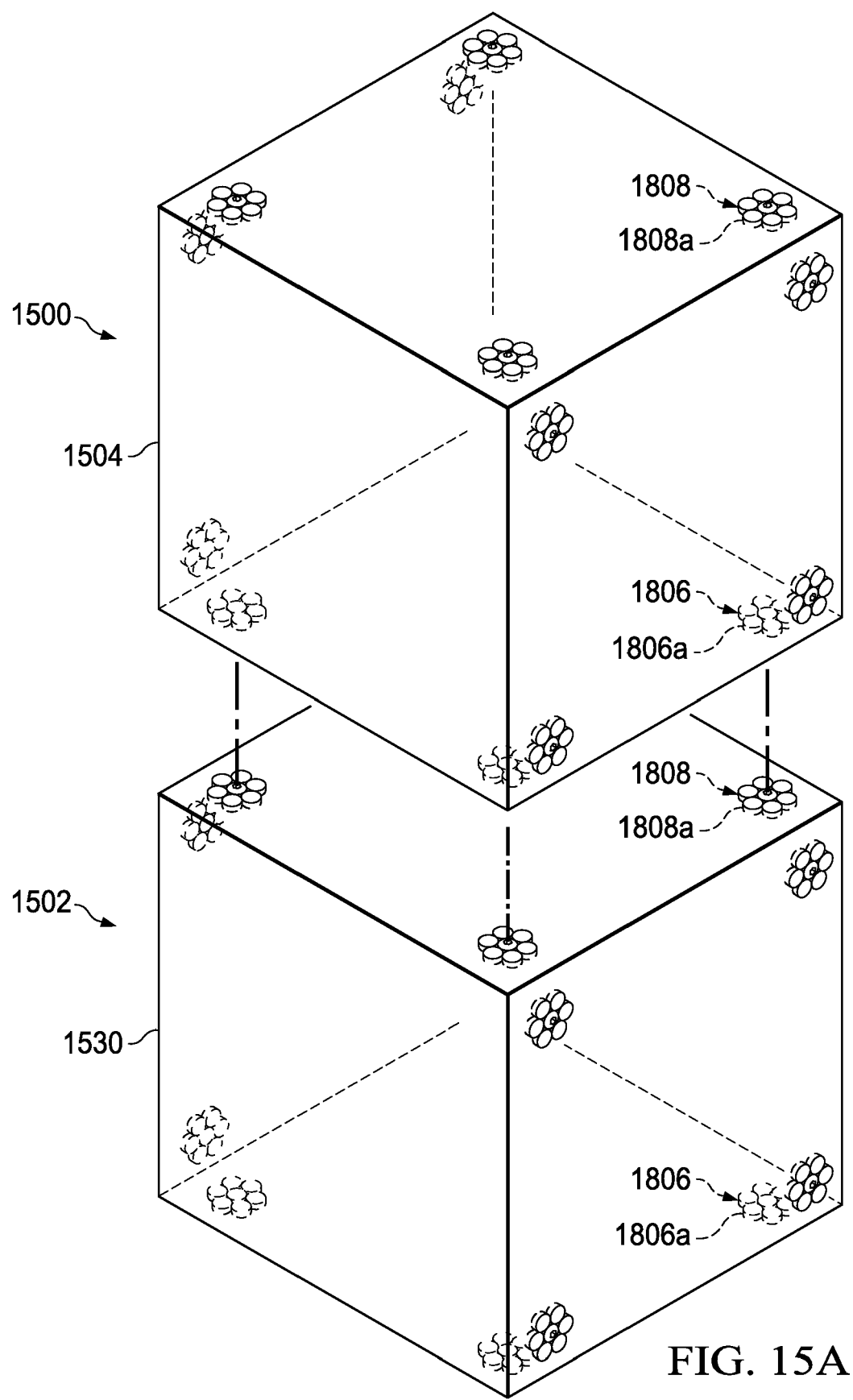
FIG. 15A is a perspective view of a configuration of two alternative exemplary crates in accordance with an embodiment of the present invention in a stacked configuration.

Referring now in particular to FIG. 15A there is illustrated an alternative exemplary embodiment of a crate 1500 that is configured to utilize magnetic field emission structures to facilitate the proper placement and orientation of a first crate 1500 in relation to a second crate 1502. The first crate 1500 and second crate 1502 are generally rectangular in shape and are manufactured from a suitable durable material. Those skilled in the art will recognize that crate 1500 and second crate 1502 could be manufactured in numerous different sizes and shapes and still retain the ability to be stored proximate one another in an efficient manner.

Each of the crates 1500 and 1502 will have integrally mounted therewith a plurality of first magnetic emission structures 1806 located, for example, on the bottom corners of crates 1500 and 1502, and a plurality of corresponding second magnetic emission structures 1808 located, for example, on the top corners of crates 1500 and 1502. The first magnetic field emission structures 1806 include an array of field emission sources 1806*a*, and the second magnetic field emission structures 1808 include an array of field emission sources 1808*a*. The magnetic field emission structures 1806 and 1808 function to substantially align and secure the crates 1500 and 1502 when placed proximate each other so as to facilitate efficient storage of more than one crate in a desired space. It is also contemplated within the scope of the present invention that the magnetic field emission structures 1806 and 1808 function to align more than one crate in a particular orientation with respect to one another. While the drawing depicted in FIG. 15 depicts two crates, those skilled in the art should recognize that any number of crates could be configured as shown in FIG. 15 so as to promote efficient storage of the crates in a desired space or to facilitate a specific orientation between the crates.

The attachment and de-attachment of the crates 1500 and 1502 occurs because the magnetic field emission structure 1806 and 1808 each comprise of an array of field emission sources 1806*a* and 1808*a* (e.g., an array of magnets) each having positions and polarities relating to a desired spatial force function that corresponds to a relative alignment of the magnetic field emission structures 1806 and 1808 within a field domain (see discussion about correlated magnet technology).

Figure 19A:
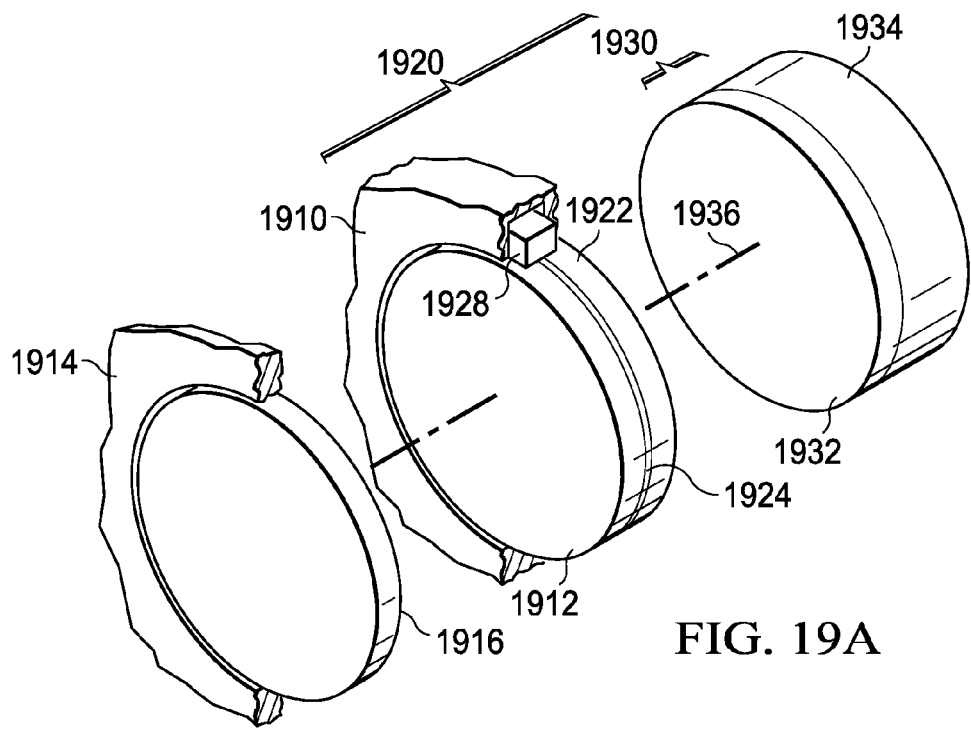
FIGS. 19A-19C illustrate several diagrams of an exemplary release mechanism that can be incorporated within the components of the embodiments of the present invention.
Figure 19B:
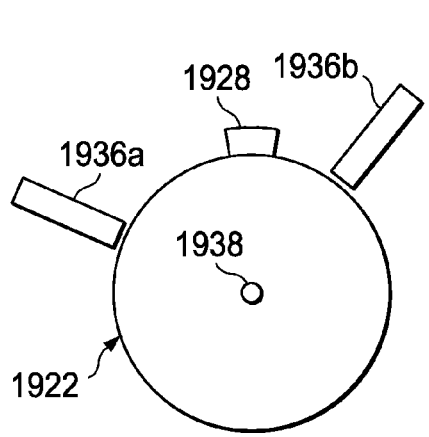
Figure 19C:
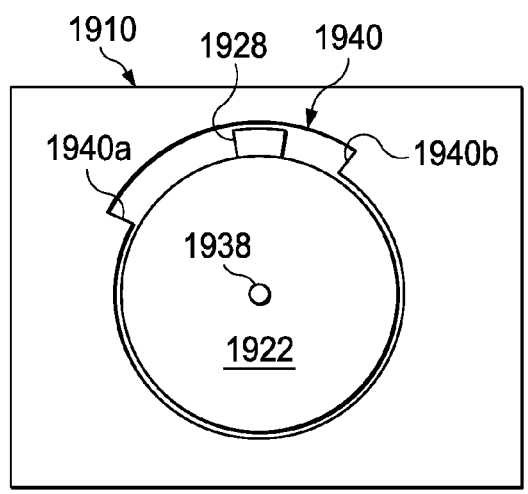

The removal or separation of the crate 1500 from the crate 1502 is accomplished by separating the attached magnetic field emission structures 1806 and 1808. In particular, the crate 1500 can be released from the crate 1502 when the first magnetic field emission structure 1806 is rotated in relation to the second magnetic field emission structure 1808 which will in turn, misalign the magnetic field emission structures 1806 and 1808. If desired, as illustrated in FIGS. 19A-19C, a release mechanism can be used to turn one of the magnetic field emission structures with respect to other.

Figure 15B:
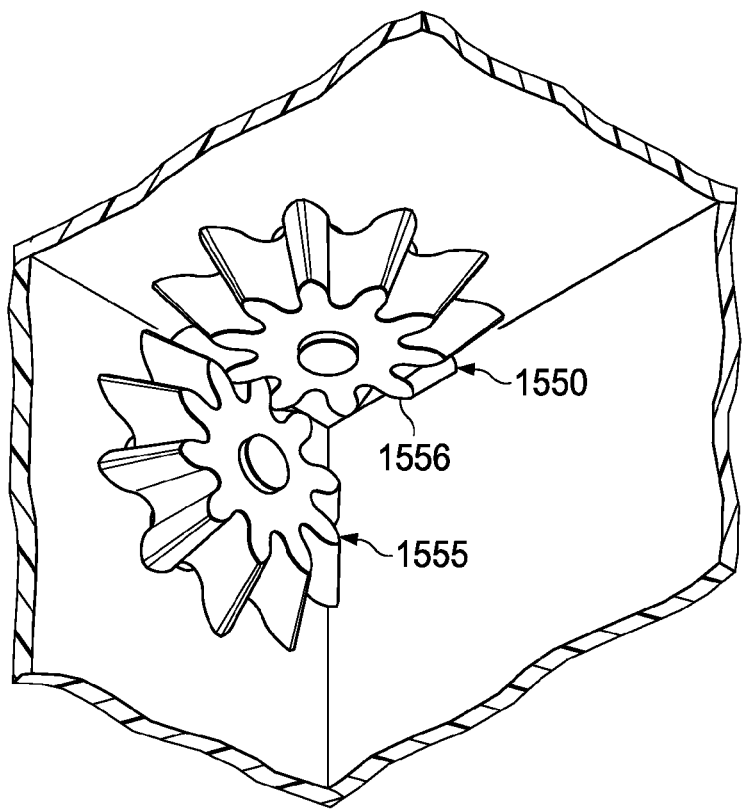
FIG. 15B is a detailed view of the pinion gears integrated into the crates illustrated in FIG. 15A.
Figure 15C:
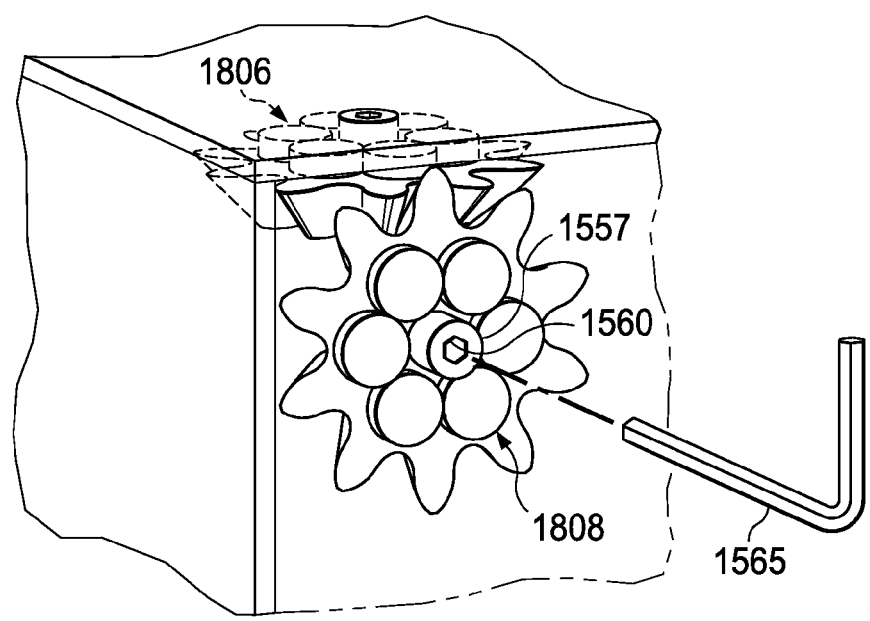
FIG. 15C is a detailed view of the pinion gears and magnetic emission structures integrated into the crates illustrated in FIG. 15A.

Referring in particular to FIGS. 15B and 15C an exemplary embodiment of rotatable mounting of the magnetic field emission structures 1806 and 1808 in order to facilitate de-attachment is depicted. The magnetic field emission structures 1806 and 1808 are secured by suitable methods to a pair of interlocking pinion gears 1550 and 1555. The pinion gears 1550 and 1555 further include a plurality of teeth 1556 that rotatably engage the pinion gears 1550, 1555 with one another. Each pinion gear 1550, 1555 is rotatably mounted to the crate 1500 via a shaft 1557. The shaft 1557 further includes an aperture 1560 that is configured to receive therein a tool 1565 such as but not limited to a hexagonal wrench. Those skilled in the art will recognize that numerous different shapes of apertures 1560 could be used in order to be operably connected with a desired tool. When a user desires to separate one crate from another, the tool 1565 is inserted into the aperture 1560 and rotated in either a clockwise or counter-clockwise direction. As the user rotates the shaft 1557 the attached magnetic field emission structure begins to rotate and decrease the spatial attraction force between any adjacent magnetic field emission structures thereby allowing a user to move the crate away from the adjacent crate.

It is further contemplated that one of the group of magnetic field emission structures 1806 and 1808 could have mounted thereto a knob or other release mechanism so as to provide a user an interface for rotating one of the magnetic emission structures with respect to the other corresponding magnetic emission structure so as to reduce the peak spatial force therebetween and facilitate decoupling.

Figure 16:
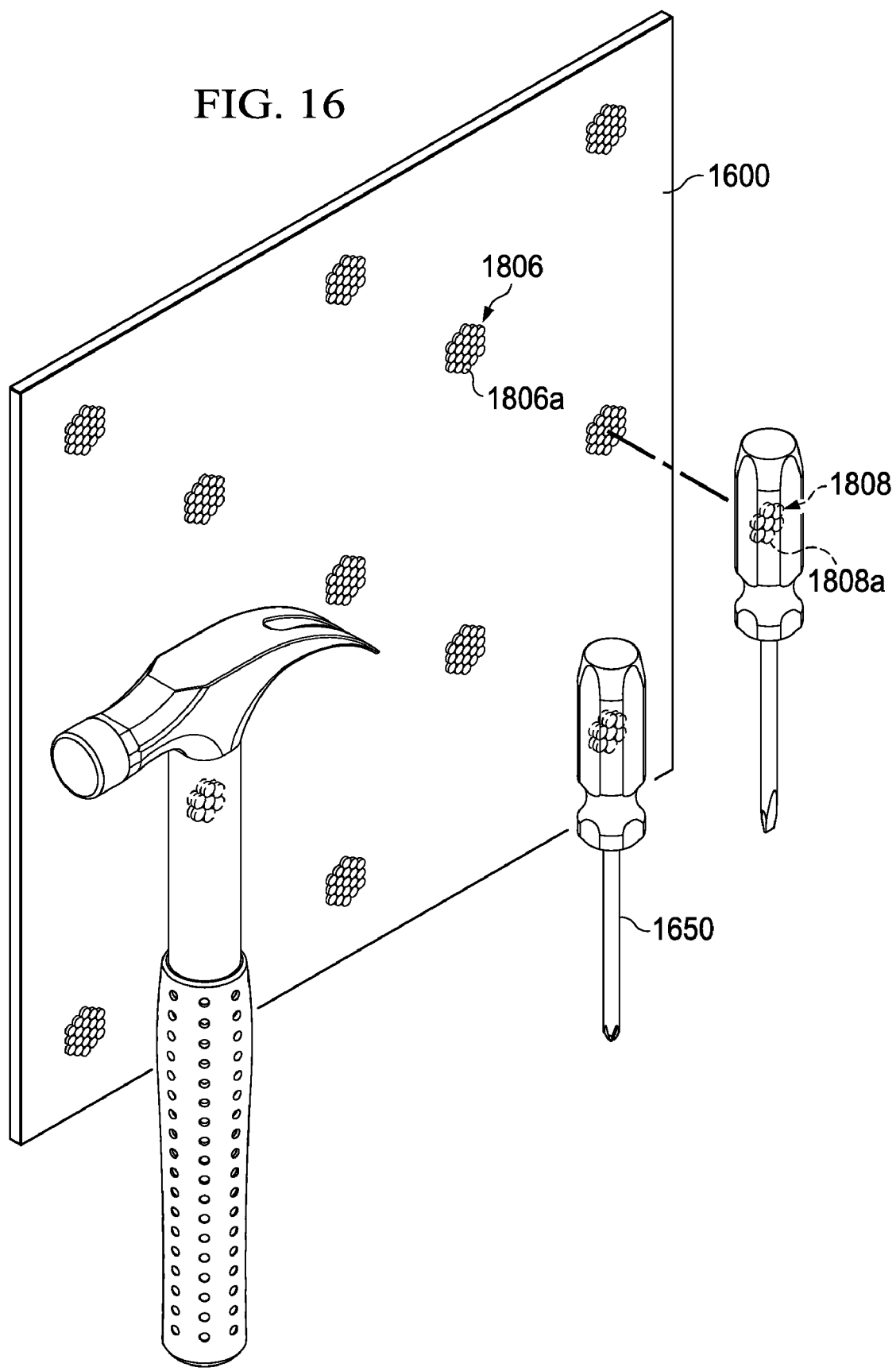
FIG. 16 is a perspective view of an exemplary wall of a crate in accordance with an embodiment of the present invention having external objects releasably secured thereto.

Referring in particular to FIG. 16 there is depicted an alternative exemplary panel member 1600 that could be utilized in any of the crate embodiments depicted and described herein. The panel member 1600 has integrally mounted thereon a plurality of first magnetic field emission structures 1806. The magnetic field emission structures 1806 further include an array of field emission sources 1806*a*. The magnetic field emission structures 1806 function to receive thereon any object that has integrated or mounted thereon a second magnetic field emission structure 1808 so as to facilitate the attachment of the object to the panel member 1600. It is contemplated that the panel member 1600 could be configured to receive objects thereon on either the outside surface or the interior surface. More specifically but not by way of limitation, the panel member 1600 could have releasably secured thereto tools, packing slip containers, keys or a variety of mechanical parts or objects.

As shown in FIG. 16 the tools 1650 have integrally mounted thereon a second magnetic field emission structure 1808. The magnetic field emission structure 1808 further includes an array of field emission sources 1808*a*. The magnetic field emission structures 1806 and 1808 both have the same code but are a mirror image of one another (see FIG. 4), such that when the magnetic field emission structure 1806 is located in certain proximity to the magnetic field emission structure 1808 and has a certain alignment with respect to one another, a peak attraction force will occur thus enabling the attachment of the tool 1650 to the panel member 1600.

The removal of the tools from the panel board 1600 is performed as described herein, by rotating the first and second magnetic field emission structures 1806 and 188 with respect to each other, such as by rotating a select tool attached to panel board 1600.

Those skilled in the art should recognize that the panel member 1600 could be configured with numerous different amounts of magnetic field emission structures so as to receive a different amount of objects thereon. Further, it is contemplated that each of the first magnetic field emission structures 1806 could be specifically coded to match a particular second magnetic field emission structure 1808, such that each tool or object to be attached to panel member 1600 has predetermined spot for attachment. This would facilitate an automatic sorting and alignment of the tools or objects to the panel member for quick packing and for quick inventory.

Figure 17:
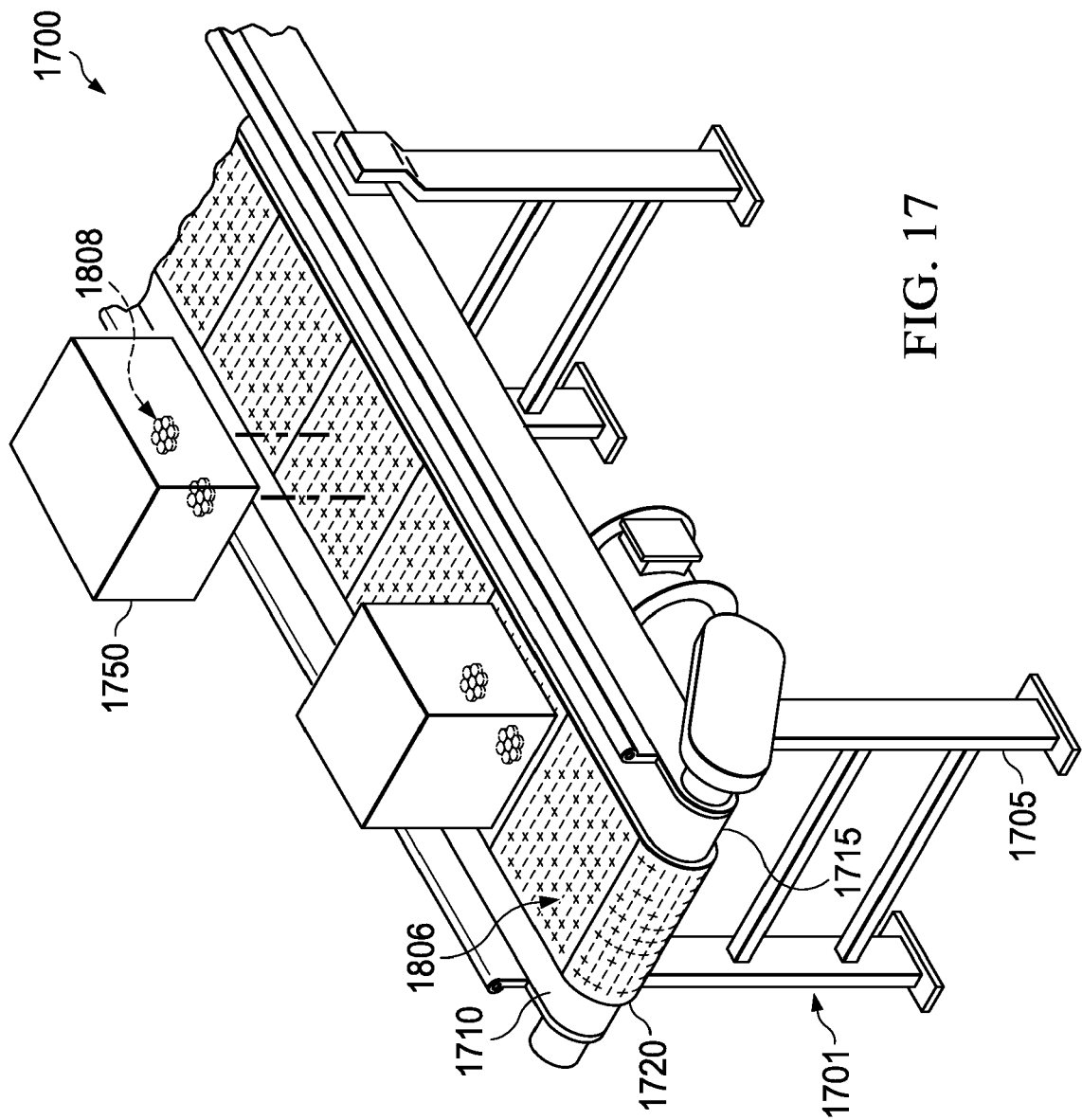
FIG. 17 is a perspective view of another alternative exemplary crate engaging with a moving system in accordance with an embodiment of the present invention.

Referring to FIG. 17 there is depicted an exemplary embodiment of a crate transportation system wherein magnetic field emission structures are utilized in a variety of capacities to regulate the interaction of a crate with at least a portion of the transportation system 1700. The transportation system 1700 includes a frame 1701 that includes a variety of support members 1705 that are configured in such a manner that the transportation system 1700 is generally elongated in shape and has a surface 1710 that is generally parallel with the horizontal support structure upon which the transportation system 1700 is superposed. A belt 1715 is movably mounted to the surface such that the belt 1715 continuously revolves around the surface 1710 much like a conventional conveyor belt. The belt 1715 further includes a surface 1720 that has wrapped thereon a first magnetic field emission structure 1806 having an exemplary code pattern of polarities configured to either repel or attract an external object having a second magnetic field emission structure 1808 superposed on the surface 1720 as a result of the spatial force function between the two magnetic field emission structures 1806 and 1808. Although magnetic field emission structures 1806 of belt 1715 are illustrated as having two different code patterns, it is contemplated that a single code pattern or more than two code patterns could be utilized, depending on a user's preference such as to accommodate objects having corresponding varying magnetic field emission structures 1808.

An exemplary crate 1750 is depicted having integrally mounted thereon a first magnetic field emission structure 1808. The magnetic field emission structure 1808 further includes an array of field emission sources 1808*a*. Subsequent a user placing the crate 1750 on the surface 1720 the crate 1750 will be moved by the peak spatial force function to a certain location on the belt 1715 wherein the crate is then releasably secured to the belt 1715. The crate 1750 is releasably secured to the belt 1715 when the first magnetic field emission structure 1806 is in certain proximity to the second magnetic field emission structure 1808 and has a certain alignment with respect to one another, a peak attraction force will occur thus enabling the attachment of the crate 1750 to the belt 1715. This allows the belt 1715 to function in producing a desired placement or orientation of the crate 1750 on the belt 1715.

An exemplary method of use for the transportation system 1700 but not by way of limitation would be to utilize the transportation system 1700 to manipulate crates or other similar objects to a particular place on the belt 1715 in order facilitate a controlled interaction of an external machine to perform a desired task on the crate 1750. More specifically but not by way of limitation precise application of a marketing or shipping label on the crate 1750 as it traverses across the surface 1710 could be performed. Such precise placement of the crate 1750 could further be utilized to assist in the filling of the crate 1750 with a desired substance.

It is further contemplated within the scope of the present invention that the belt 1715 could be replaced with a non-moving correlated magnetic surface having a plurality of electromagnets integrated thereon wherein a user could activate or deactivate a particular code pattern so as to manipulate any object having a magnetic field emission structure integrally mounted thereon. In this embodiment a code pattern sequence could be activated electronically so as to move a crate with a magnetic field emission structure thereon in a particular direction through the transportation system. The code pattern could further be used to assist in sorting by directing the crate to an alternate route, precise orientation as required to either fill, label or perform other necessary tasks to the crate.

Figure 18A:
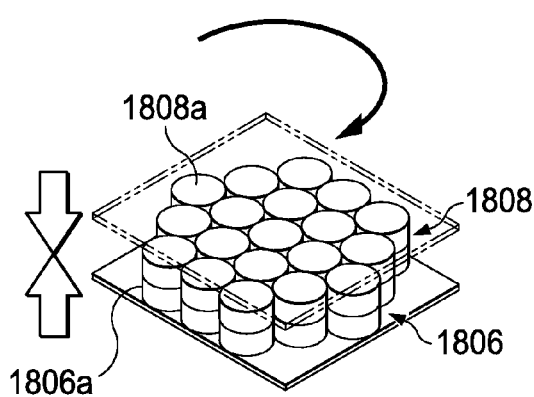
FIGS. 18A-18I are diagrams that illustrate a portion of the components of the present invention which is used to show how first and second magnetic field emission structure can be aligned or misaligned relative to each other to secure or remove the first and second magnetic field emission structures from each other.

Referring to FIGS. 18A-18I, there is depicted an exemplary first magnetic field emission structure 1806 (attached to a portion of the exemplary embodiments and alternative embodiments of the present invention described herein) and its mirror image second magnetic field emission structure 1808 (attached to a portion of the exemplary embodiments and alternative embodiments of the present invention) and the resulting spatial forces produced in accordance with their various alignments as they are twisted relative to each other which enables one to operably couple or de-couple the first and second magnetic field emission structures 1806 and 1808. FIG. 18A illustrates the magnetic field emission structure 1806 and the mirror image second magnetic field emission structure 1808 being aligned producing a peak spatial force.

Figure 18D:
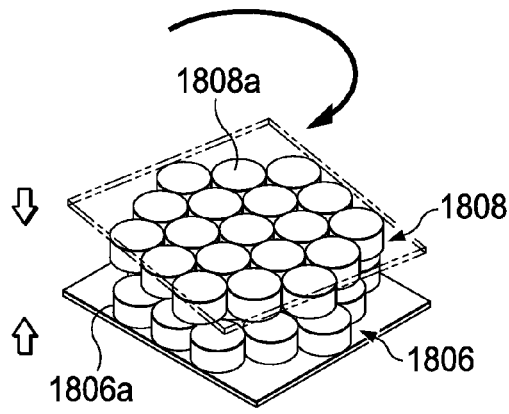
Figure 18B:
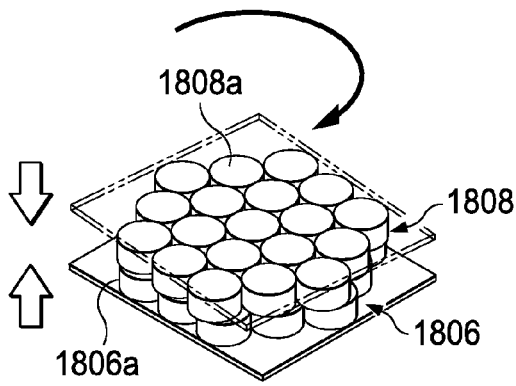
Figure 18E:
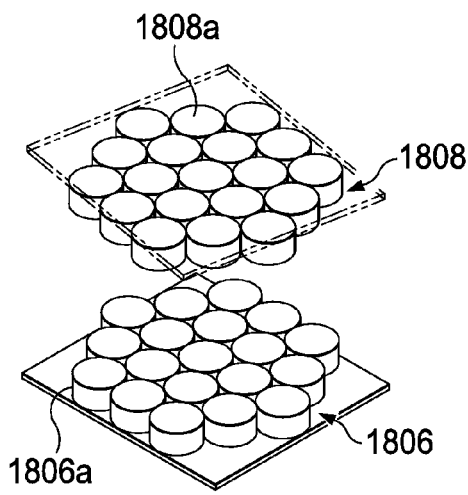
Figure 18C:
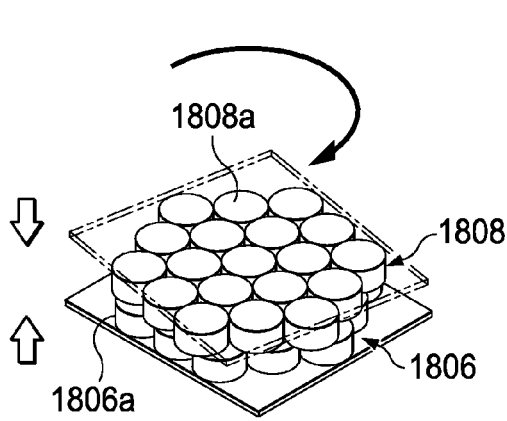
Figure 18F:
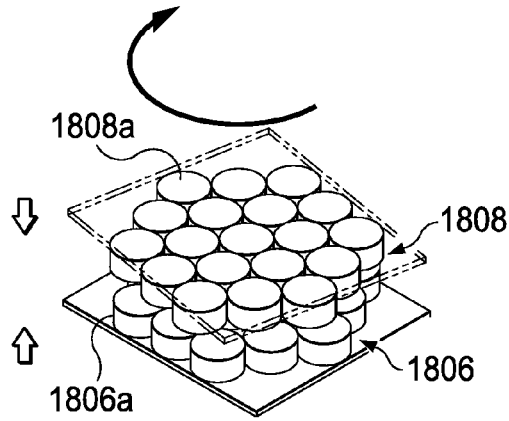
Figure 18G:
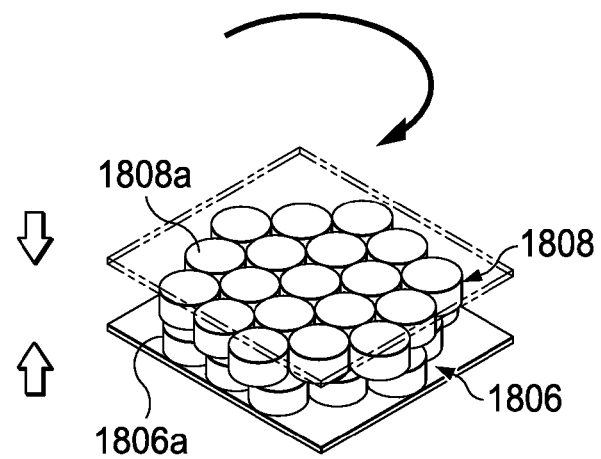
Figure 18H:
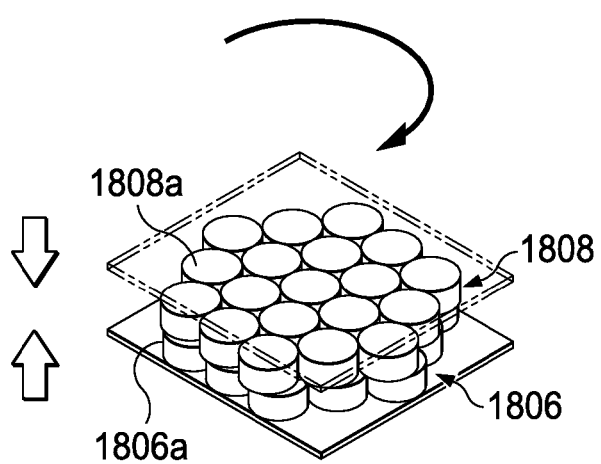
Figure 18I:
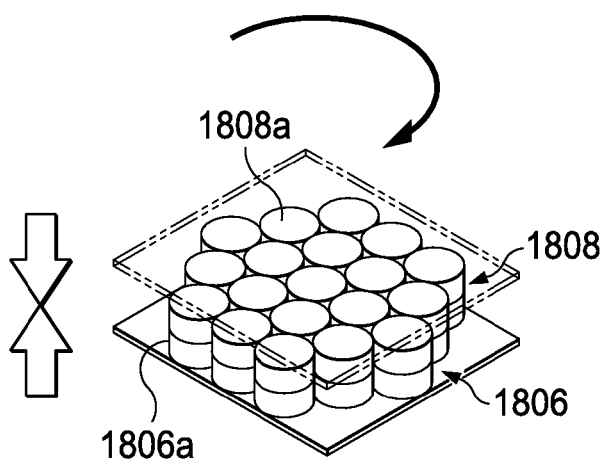

FIG. 18B illustrates the mirror image second magnetic field emission structure 1808 being slightly askew relative to the magnetic field emission structure 1806 and the attractive force reduces significantly. In FIG. 18C, the mirror image second magnetic field emission structure 1808 is further rotated or askew and the attractive force continues to decrease. In FIG. 18D, the mirror image second magnetic field emission structure 1808 is still further rotated until the attractive force becomes very small, such that the two magnetic field emission structures 1806 and 1808 are easily separated as shown in FIG. 18E. Given the two magnetic field emission structures 1806 and 1808 held somewhat apart as in FIG. 18E, the two magnetic field emission structures 1806 and 1808 can be moved closer towards alignment producing a small spatial force as in FIG. 18F. The spatial force increases as the two magnetic field emission structures 1806 and 1808 become more and more aligned in FIGS. 18G and 18H and a peak spatial force is achieved when aligned as in FIG. 18I. It should be noted that the direction of rotation was arbitrarily chosen and may be varied depending on the code employed. Additionally, the mirror image second magnetic field emission structure 1808 is the mirror of the first magnetic field emission structure 1806 resulting in an attractive peak spatial force (see also FIG. 34). This method of coupling or de-coupling is a marked-improvement over the existing technology in which conventional threads or other conventional fasteners are utilized having the problems associated therewith as previously described herein.

FIGS. 19A-19C illustrate and exemplary embodiment of a release mechanism as described herein above that is used to rotate one magnetic field emission structure relative to the corresponding connecting magnetic field emission structure so as to couple or de-couple the exemplary embodiments and alternative embodiments of the present invention described herein.

In FIG. 19A, the one end 1910 has the magnetic field emission structure 1912 with a first code and the other end 1914 has the mirror image magnetic field emission structure 1916 also based on the first code. The magnetic field emission structure 1912 is physically secured to the release mechanism's magnetic field emission structure 1922 which has a second code. A separation layer 1924 made from a high permeability material may be placed between the two magnetic field emission structures 1912 and 1922 to keep their magnetic fields from interacting with one another. The two magnetic field emission structures 1912 and 1922 are configured so that they can turn about axis 1926 allowing them to be moved so as to allow attachment to and detachment from the magnetic field emission structure 1916 which enables the two ends 1910 and 1914 to be connected to and separated from one another. The release mechanism 1920 can also include at least one tab 1928 which is positioned to stop the movement of the two magnetic field emission structures 1912 and 1922. In addition, the release mechanism 1920 can include a key mechanism 1930 which has a magnetic field emission structure 1932 which is coded using the second code such that it corresponds to the mirror image of the magnetic emission field structure 1922. The key mechanism 1930 also includes a gripping mechanism 1934 that would typically be turned by hand. As shown, the key mechanism 1930 can be attached to the end 1910 by substantially aligning the two magnetic field structures 1922 and 1932. The gripping mechanism 1934 can then be turned about axis 1926 so as to align or misalign the two magnetic field emission structures 1912 and 1916, thereby attaching or detaching the two ends 1910 and 1914.

In FIG. 19B, there is depicted a general concept of using the tab 1928 so as to limit the movement of the two magnetic field emission structures 1912 and 1922 between two travel limiters 1936*a* and 1936*b*. The two magnetic field emission structures 1912 and 1922 are shown having a hole 1938 through their middle that enables them to turn about the axis 1926. The two travel limiters 1936a and 1936b might be any fixed object placed at desired locations that limit the turning radius of the two magnetic field emission structures 1912 and 1922.

FIG. 19C depicts an alternative approach where end 1910 includes a travel channel 1940 that is configured to enable the two magnetic field emission structures 1912 and 1922 to turn about the axis 1926 using hole 1938 and has travel limiters 1940a and 1940b that limit the turning radius. One skilled in the art would recognize that the tab 1928 and at least one travel limiter 1936a, 1936b, 1940a and 1940b are provided to simplify the detachment of key mechanism 1930 from the end 1910.

It is further contemplated within the scope of the present invention that the exemplary embodiments illustrated herein further include an additional magnetic field emission structure to facilitate the securing of the exemplary embodiments to an object having a corresponding magnetic field emission structure. More specifically but not by way of limitation the additional magnetic field emission structure could be releasably secured to a corresponding magnetic field emission structure integrally mounted on a storage rack, a shelf, a wall, a portion of a trailer, plane, vehicle, ship, barge, or boat, or numerous other types of storage devices that function to organize and store the exemplary embodiments illustrated herein. Moreover, complementary magnetic field emission structures can be used with forklifts and other devices used to move crates. Additionally, ropes, straps, tie-downs, bungee cords, etc. could include magnetic field emission structures. Furthermore, such crates can be placed into larger crates or containers such as large metal containers used in shipping and even such larger containers can use complementary magnetic field structures to enable them to be handled easier, stacked easier, etc. as was described in relation to crates and other containers herein. It is further contemplated within the scope of the present invention that each exemplary embodiment of the present invention depicted herein could have magnetic field emission structures coded such that only particular exemplary embodiments could be operably secured to each other and further to control any specific, required orientation of coupling the exemplary embodiments together. It should also be recognized that for certain exemplary embodiments referenced herein that it may be desirable to have a hermetic seal when any of the two exemplary embodiments are operably coupled.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A container, comprising:
a first section, said first section including a first field emission structure;
a second section, said second section including a second field emission structure where said second section is releasably secured to said first section when said first and said second field emission structures are located proximate to one another and have a certain alignment with respect to one another, and where each of said first and second field emission structures include an array of field emission sources each having positions and polarities relating to a desired spatial force function that corresponds to a relative alignment of said first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The container of claim 1, wherein said second section is released from said first section when said first and said second field emission structures are changed from said certain alignment with respect to one another.

3. The container of claim 2, and further including a release mechanism that turns said second field emission structure with respect to said first field emission structure so as to facilitate the release and attachment of said first section from said second section.

4. The container of claim 3, wherein each of said first section and said second section are at least one of a wall panel, top panel, side panel, bottom panel, door panel, a handle, a tool, a belt, a frame member and locking member.

5. The container of claim 1, wherein said first field emission structure and said second field emission structure releasably secure said first and second sections in a particular orientation with respect to one another.

6. The container of claim 3, wherein said first section includes a plurality of said first field emission structures and said second section includes a plurality of said second field emission structures, where each of said plurality of first emission structures are operable to engage each of said plurality of second emission structures.

7. The container of claim 3, and further including a third field emission structure operable to connect to a fourth field emission structure integrated with an external object to facilitate the connection of the said container to the object.

8. The container of claim 1, wherein said positions and said polarities of each field emission source of each said array of field emission sources are determined in accordance with at least one correlation function.

9. The container of claim 8, wherein said at least one correlation function is in accordance with at least one code.

10. The container of claim 9, wherein said at least one code is at least one of a pseudorandom code, a deterministic code, or a designed code.

11. The container of claim 9, wherein said at least one code is one of a one dimensional code, a two dimensional code, a three dimensional code, and a four dimensional code.

12. The container of claim 1, wherein each field emission source of each said array of field emission sources has a corresponding field emission amplitude and vector direction determined in accordance with the desired spatial force function, wherein a separation distance between the first and second field emission structures and the relative alignment of the first and second field emission structures creates a spatial force in accordance with the desired spatial force function.

13. The container of claim 12, wherein said spatial force comprises at least one of an attractive spatial force or a repellant spatial force.

14. The container of claim 12, wherein said spatial force corresponds to a peak spatial force of said desired spatial force function when said first and second field emission structures are substantially aligned such that each field emission source of said first field emission structure substantially aligns with a corresponding field emission source of said second field emission structure.

15. The container of claim 1, wherein said field domain corresponds to first field emissions from said array of first field emission sources of said first field emission structure interacting with second field emissions from said array of second field emission sources of said second field emission structure.

16. The container of claim 1, wherein said polarities of the field emission sources comprise at least one of North-South polarities or positive-negative polarities.

17. The container of claim 1, wherein at least one of said field emission sources comprises a magnetic field emission source or an electric field emission source.

18. The container of claim 1, wherein at least one of said field emission sources comprises a permanent magnet, an electromagnet, an electret, a magnetized ferromagnetic material, a portion of a magnetized ferromagnetic material, a soft magnetic material, or a superconductive magnetic material.

19. A method for assembling a first section of a container to a section of the container, said method comprising the steps of:
   attaching a first emission structure to the first section of the container;
   attaching a second emission structure to the second section of the container; and
   aligning the first and second field emission structures so the first section of the container attaches to the second section of the container when the first and second field emission structures are located next to one another and have a certain alignment with respect to one another, where each of the first and second field emission structures include field emission sources each having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

20. The method of claim 19, further comprising the step of releasing said first section from said second section.

21. The method of claim 20, wherein said step of releasing said section from said second section further includes rotating the first and second field emission structures with respect to one another.

22. The method of claim 19, said first section is a selected from one of the following: wall panel, top panel, side panel, bottom panel, door panel, a handle, a tool, a belt, a frame member or locking member.

23. The method of claim 21, wherein the second section is selected from one of the following: wall panel, top panel, side panel, bottom panel, door panel, a handle, a tool, a belt, a frame member or locking member.

* * * * *